United States Patent
Mori

(10) Patent No.: US 7,917,032 B2
(45) Date of Patent: *Mar. 29, 2011

(54) MULTI-BIT-RATE OPTICAL COMMUNICATION METHOD, OPTICAL NETWORK UNIT, AND OPTICAL LINE TERMINAL

(75) Inventor: Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 949 days.

This patent is subject to a terminal disclaimer.

(21) Appl. No.: 11/582,399

(22) Filed: Oct. 18, 2006

(65) Prior Publication Data

US 2008/0002977 A1    Jan. 3, 2008

(30) Foreign Application Priority Data

Jun. 30, 2006 (JP) .................... 2006-181635

(51) Int. Cl.
*H04J 14/00* (2006.01)

(52) U.S. Cl. ............ 398/72; 398/99; 398/100; 398/202; 398/214; 370/392; 370/432; 370/465; 370/395.1; 375/348; 375/354

(58) Field of Classification Search .............. 398/71, 398/66, 83, 148, 149, 67, 68, 69, 70, 72, 398/98, 99, 100, 75, 79, 202, 208, 209, 214, 398/135, 136, 212, 210, 211, 213; 359/154, 359/158, 337; 370/432, 471, 465, 366, 392, 370/395.1, 476, 419; 375/348, 316, 354, 375/355

See application file for complete search history.

(56) References Cited

U.S. PATENT DOCUMENTS

| 5,509,003 | A | 4/1996 | Snijders et al. | |
|---|---|---|---|---|
| 6,611,928 | B1* | 8/2003 | Fujiyoshi et al. | 714/715 |
| 7,362,779 | B1* | 4/2008 | Zabezhinsky | 370/512 |
| 7,653,312 | B2* | 1/2010 | Mori | 398/100 |
| 2001/0019441 | A1* | 9/2001 | Kogure et al. | 359/158 |
| 2002/0048069 | A1* | 4/2002 | Ibukuro | 359/154 |
| 2004/0130778 | A1* | 7/2004 | Smith et al. | 359/337 |
| 2006/0133809 | A1* | 6/2006 | Chow et al. | 398/66 |

FOREIGN PATENT DOCUMENTS

JP    8-8954    1/1996

OTHER PUBLICATIONS

Korean Patent Office Notice of Grounds of Rejection issued Sep. 19, 2007 for corresponding Korean Patent Application No. 10-2006-113145.

* cited by examiner

*Primary Examiner* — Hanh Phan
(74) *Attorney, Agent, or Firm* — Staas & Halsey LLP

(57) ABSTRACT

The present invention relates to a multi-bit-rate optical communication method, optical network units, and an optical line terminal that enable multi-bit-rate transmission of low bit-rate data and high bit-rate data while maintaining compatibility with existing systems and reducing upgrade costs of optical network units and labor required for the upgrade, wherein the optical line terminal transmits a first data area including frame synchronization information in a predetermined frame format at a first bit rate and a second data area at a second bit rate which is the first bit rate×$M_{down}$ ($M_{down}$>1), and any of the optical network units performs reception processing at a rate once every $M_{down}$-bit to detect the frame synchronization information in the first data area and, based on detection timing thereof, performs reception processing of the second data area by a bit.

20 Claims, 18 Drawing Sheets

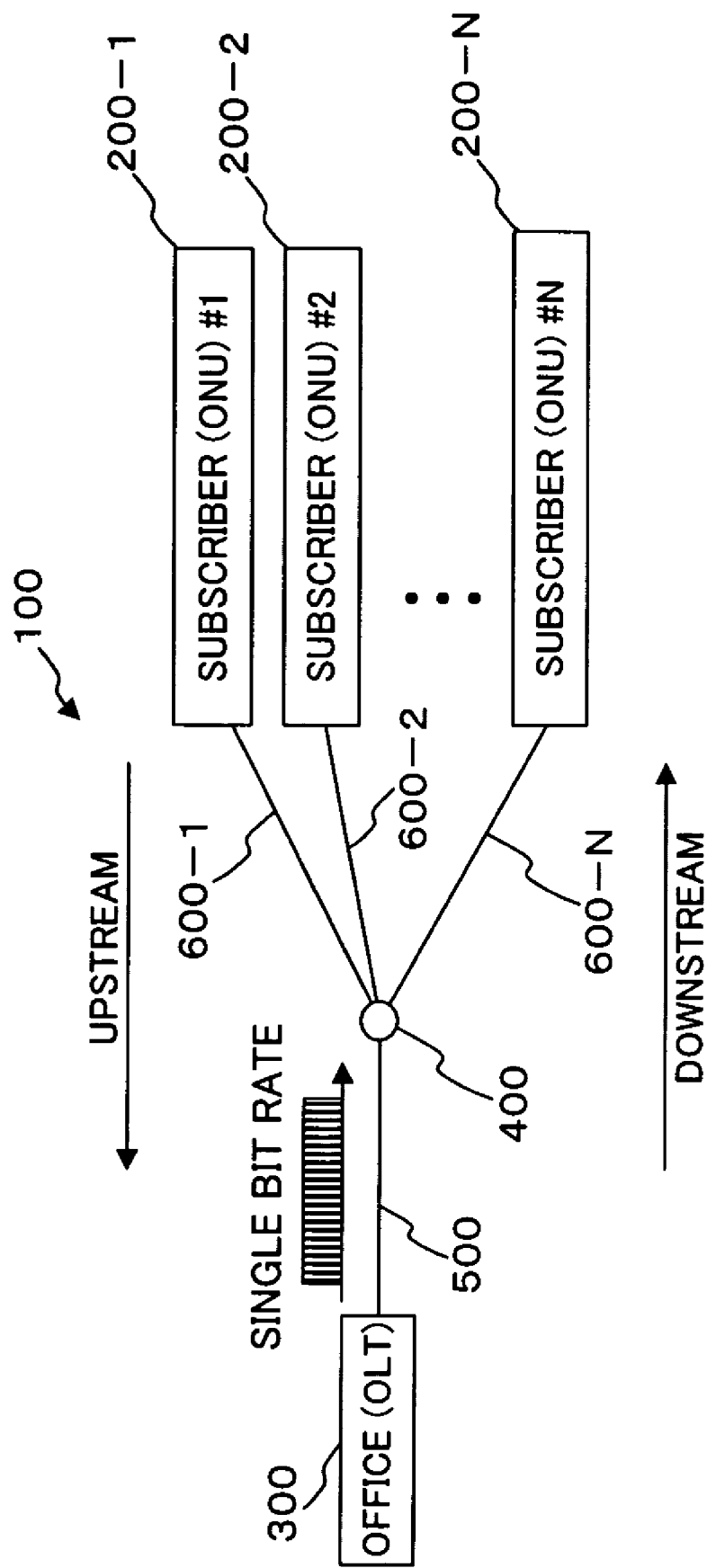

MULTI-BIT-RATE OPTICAL COMMUNICATION METHOD, OPTICAL NETWORK UNIT, AND OPTICAL LINE TERMINAL

CROSS REFERENCE TO RELATED APPLICATIONS

This application is based on and hereby claims priority to Japanese Application No. 2006-181635 filed on Jun. 30, 2006 in Japan, the contents of which are hereby incorporated by reference.

BACKGROUND OF THE INVENTION (1) Field of the Invention

The present invention relates to a multi-bit-rate optical communication method, an optical network unit, and an optical line terminal and, for example, relates to a technology suitable for use in a system in which a passive optical network (PON) is adopted.

(2) Description of the Related Art

At present, as a subscriber optical fiber network system intended for subscriber homes such as ordinary households, systems that connect an optical line terminal (office) provided at a central office installed, for example, in a telephone central office and optical network units installed in a plurality of subscriber homes via an optical fiber are known. Among them, a configuration is called a PON system in which an optical fiber used for input/output of an optical data signal from/to a central office is branched into a plurality of optical fibers by a power splitter, which is a passive element, and an optical network unit of each subscriber home is connected to the branch destination.

The PON system has been commercially in use as a system capable of transmitting and receiving data at high speed between an optical line terminal and a plurality of subscriber homes.

As a form of communication network using the PON system, for example, a system configuration shown in FIG. 18 can be mentioned.

A PON system 100 shown in FIG. 18 comprises an optical line terminal (OLT) 300, N units of optical network unit (ONU) 200-1 to 200-N (denoted simply as ONU 200 when not distinguished) corresponding to N (N is an integer equal to or greater than 2) subscribers #1 to #N, a power splitter 400, an optical fiber 500 connecting the OLT 300 and the power splitter 400, and optical fibers 600-1 to 600-N (denoted simply as an optical fiber 600 when not distinguished) connecting the power splitter 400 and each ONU 200-1 to 200-N respectively.

In the PON system 100, to perform information delivery and the like, the OLT 300 is an apparatus equipped with a required communication control function of converting an electric signal into an optical signal to transmit the optical signal to an ONU 200 side in a predetermined downstream frame format, converting data transmitted from the ONU 200 as an optical signal in a predetermined upstream frame format into an electric signal or the like.

The optical fiber 500 connected to the OLT 300 is branched by the power splitter 400 provided in midstream of the transmission line, and a branched optical fiber 600 is drawn into each individual subscriber home to be connected to each ONU 200.

The ONU 200 is an apparatus that performs communication control such as communication with the OLT 300 and conversion between an optical signal and an electric signal.

Here, one optical fiber 500 is used for upstream and downstream data transmission between the OLT 300 and the power splitter 400 bi-directionally by wavelength division multiplexing (WDM). Incidentally, the direction from the OLT 300 to the ONU 200 is downstream, and that from the ONU 200 to the OLT 300 is upstream.

For example, a downstream frame from the OLT 300 to the ONU 200 is transmitted as an optical signal in a 1.49 μm band at a single bit rate A by time division multiplexing (TDM), and the ONU 200 detects frame synchronization information and management information in the downstream frame to extract, based on this information, data in time slot individually allocated in advance. Meanwhile, an upstream frame from the ONU 200 to the OLT 300 is transmitted from the ONU 200 with timing provided by the OLT 300. That is, an upstream frame from each ONU 200 is transmitted with timings to avoid collision as an optical signal in a 1.31 μm band by time division multiple access (TDMA) system.

The power splitter 400 plays a role of distributing (power branching) a downstream frame from one optical fiber 500 into a plurality of optical fibers 600 and aggregating (multiplexing) upstream frames from a plurality of optical fibers 600 into one optical fiber 500.

By the way, the PON system 100 has generally been studied for use to provide a low-speed service as low as a telephone service. However, as demand for a high-speed communication service such as a video phone service and a video conferencing service that are faster than the telephone service has increased in recent years, provision of low-bit-rate data (low-speed service such as the telephone service) and high-bit-rate data (high-speed service such as the video phone service and video conferencing service) by one PON system 100 has been desired.

For example, in Patent Document 1 shown below, a method of increasing service capacity in a point to multipoint optical transmission system that realizes an increase in service capacity by using a multi-rate burst circuit that generates a signal of different rate for each time slot is disclosed.

[Patent Document 1] Japanese Patent Laid-Open (Kokai) No. HEI 8-8954

According to the above-described technology, to provide low-bit-rate data and high-bit-rate data by one PON system, expansion, in addition to a low-speed service, to a high-speed service is enabled by equipping every ONU 200 with a multi-rate burst circuit in advance and assigning a different transmission speed (bit rate) to part of time slots allocated to one ONU 200.

However, since in an existing system, for example, such as a G-PON (Gigabit-capable Passive Optical Network) being standardized by ITU (International Telecommunication Union), a method in which the bit rate is changed for each service in the physical layer to be transmitted is not adopted, there is a problem that the method described in Patent Document 1 is not compatible with existing systems.

Here, in the aforementioned Patent Document 1, compatibility with existing systems as described above is neither considered nor suggested.

Moreover, since the technology described in Patent Document 1 requires preparation (equipment) of a multi-rate burst circuit in every ONU 200 in advance, a subscriber who wants no high-speed service must also upgrade (equipment of a multi-rate burst circuit and so on) an ONU, posing a problem of complicated apparatus upgrading and cost burden thereof.

SUMMARY OF THE INVENTION

The present invention has been developed in view of the above-described problems and it is therefore an object of the present invention to enable a PON system or the like to easily transmit data of different bit rates together while maintaining compatibility with existing systems and reducing upgrade costs of ONUs and labor required for the upgrade.

To achieve the above-described object, the present invention is characterized in that a multi-bit-rate optical communication method, optical network units and an optical line terminal described below are used. That is, (1) A multi-bit-rate optical communication method according to the present invention is characterized in that, in an optical communication system having an optical line terminal, a plurality of optical network units, and a branching unit branching an optical signal transmitted in a predetermined frame format from the optical line terminal into the plurality of optical network units, the optical line terminal transmits a first data area including frame synchronization information in the frame format at a first bit rate and transmits a second data area at a second bit rate which is the first bit rate×$M_{down}$ ($M_{down}>1$), and any of the optical network units performs reception processing of an optical signal from the branching unit at a rate once every $M_{down}$-bit to detect the frame synchronization information in the first data area in the frame format and performs, based on detection timing thereof, reception processing of the second data area in the frame format by a bit.

(2) Here, the $M_{down}$ may be an integer.

(3) The optical network unit may, after detecting an edge of a received optical signal, control start timing of the reception processing at the rate once every $M_{down}$-bit based on the detection timing of the edge.

(4) Furthermore, the optical network unit may perform reception processing of the optical signal at a clock frequency corresponding to the second bit rate to detect an $M_{down}$-bit same code continuing portion and perform reception processing of the same code continuing portion at the rate once every $M_{down}$-bit to detect the frame synchronization information.

(5) Also, a multi-bit-rate optical communication method according to the present invention is characterized in that, in an optical communication system having an optical network unit that transmits an optical signal at a first bit rate, an optical network unit that transmits an optical signal at a second bit rate which is the first bit rate×$M_{up}$ ($M_{up}>1$), a multiplexing unit multiplexing an optical signal from each of the optical network units, and an optical line terminal for receiving an optical signal multiplexed by the multiplexing unit, the optical line terminal performs reception processing of an optical signal from the multiplexing unit at a clock frequency corresponding to the second bit rate to establish bit synchronization and performs reception processing of an optical signal of the first bit rate at a rate once every $M_{up}$-bit and an optical signal at the second bit rate by a bit based on predetermined transmission timing for each of the optical network units.

(6) Furthermore, an optical network unit according to the present invention to be used in an optical communication system having an optical line terminal that transmits a first data area including frame synchronization information in a predetermined frame format at a first bit rate and transmits a second data area at a second bit rate which is the first bit rate×$M_{down}$ ($M_{down}>1$), a plurality of optical network units, and a branching unit branching an optical signal transmitted from the optical line terminal in the frame format to the plurality of optical network units, comprises a frame synchronization processing unit that performs reception processing of an optical signal from the branching unit at a rate once every $M_{down}$-bit to detect the frame synchronization information in the first data area in the frame format and a data processing unit that performs reception processing of the second data area in the frame format by a bit based on detection timing by the frame synchronization processing unit.

(7) Here, the $M_{down}$ may be an integer.

(8) The frame synchronization processing unit may include an edge detector for detecting an edge of a received optical signal and a controller for controlling start timing of the reception processing at the rate once every $M_{down}$-bit based on detection timing by the edge detector.

(9) Furthermore, the frame synchronization processing unit may comprise a same code continuing detector for detecting an $M_{down}$-bit same code continuing portion by performing reception processing of the optical signal at a clock frequency corresponding to the second bit rate and a frame synchronization detector for detecting the frame synchronization information by performing reception processing of the same code continuing portion detected by the same code continuing detector at the rate once every $M_{down}$-bit.

(10) Moreover, an optical line terminal according to the present invention to be used in an optical communication system having an optical network unit that transmits an optical signal at a first bit rate, an optical network unit that transmits an optical signal at a second bit rate which is the first bit rate×$M_{up}$ ($M_{up}>1$), a multiplexing unit multiplexing an optical signal from each of the optical network units, and the optical line terminal for receiving an optical signal multiplexed by the multiplexing unit, comprises a bit synchronization processing unit for establishing bit synchronization by performing reception processing of an optical signal from the multiplexing unit at a clock frequency corresponding to the second bit rate and a data processing unit for performing reception processing of an optical signal of the first bit rate at a rate once every $M_{up}$-bit and an optical signal at the second bit rate by a bit based on predetermined transmission timing for each of the optical network units.

According to the present invention described above, at least any of effects or advantages described below will be obtained:

(1) Since an optical line terminal transmits the first data area including frame synchronization information in a frame format at the first bit rate and transmits the second data area at the second bit rate which is the first bit rate×$M_{down}$ ($M_{down}>1$), and any of the optical network units performs reception processing of an optical signal thereof at the rate once every $M_{down}$-bit to detect the frame synchronization information in the first data area in the frame format, and performs, based on detection timing thereof, reception processing of the second data area in the frame format by a bit, an optical network unit upgraded for receiving data at second bit rate can correctly perform reception processing of data addressed to the own unit at the second bit rate through simple reception processing at the rate once every $M_{down}$-bit without requiring complex rate conversion processing of frame synchronization information at the first bit rate and the like. Therefore, by upgrading only optical network units that require a service at the second bit rate while leaving those optical network units for which an optical signal (service) at the first bit rate is sufficient (in other words, data at second bit rate is not needed) as they are (without upgrading), communication in which an optical signal at the first bit rate and that at the second bit rate are mixed in the frame format can easily be realized, enabling significant reduction in costs of upgrading optical network units and labor required for the upgrade.

Since an upgraded optical network unit can normally process a signal at the first bit rate by performing reception processing at the rate once every $M_{down}$-bit, compatibility with existing systems can also be maintained.

(2) Here, making $M_{down}$ be an integer, the second bit rate can be set as an integral multiple of the first bit rate. In this case, a circuit configuration of a frame synchronization processing unit in an optical network unit can be realized as a simple configuration.

(3) In addition, the frame synchronization processing unit may comprise an edge detector for detecting an edge of a received optical signal and a controller for controlling start timing of reception processing at the rate once every $M_{down}$-bit based on detection timing by the edge detector. In this case, start timing of the reception processing can easily be optimized.

(4) Furthermore, the frame synchronization processing unit may include a same code continuing detector for detecting an $M_{down}$-bit same code continuing portion by performing reception processing of the optical signal at a clock frequency corresponding to the second bit rate and a frame synchronization detector for detecting the frame synchronization information by performing reception processing of the same code continuing portion detected by the same code continuing detector at the rate once every $M_{down}$-bit. In this case, the frame synchronization processing unit can be realized with a simple circuit configuration.

(5) In addition, since an optical line terminal establishes bit synchronization by performing reception processing of an optical signal from the multiplexing unit at a clock frequency corresponding to the second bit rate and performs reception processing of an optical signal of the first bit rate at the rate once every $M_{up}$-bit and an optical signal at the second bit rate by a bit based on predetermined transmission timing for each of the optical network units, reception processing of each of an optical signal at the first bit rate and that at the second bit rate from each optical network unit can correctly be performed with a simple configuration without requiring synchronization establishment by optical signal at each rate.

BRIEF DESCRIPTION OF THE DRAWINGS

FIG. 18 is a diagram showing a configuration of a conventional PON system.

DESCRIPTION OF THE PREFERRED EMBODIMENTS

An embodiment of the present invention and variants thereof will be described below using drawings.

[A] Description of an Embodiment

Figure 1:
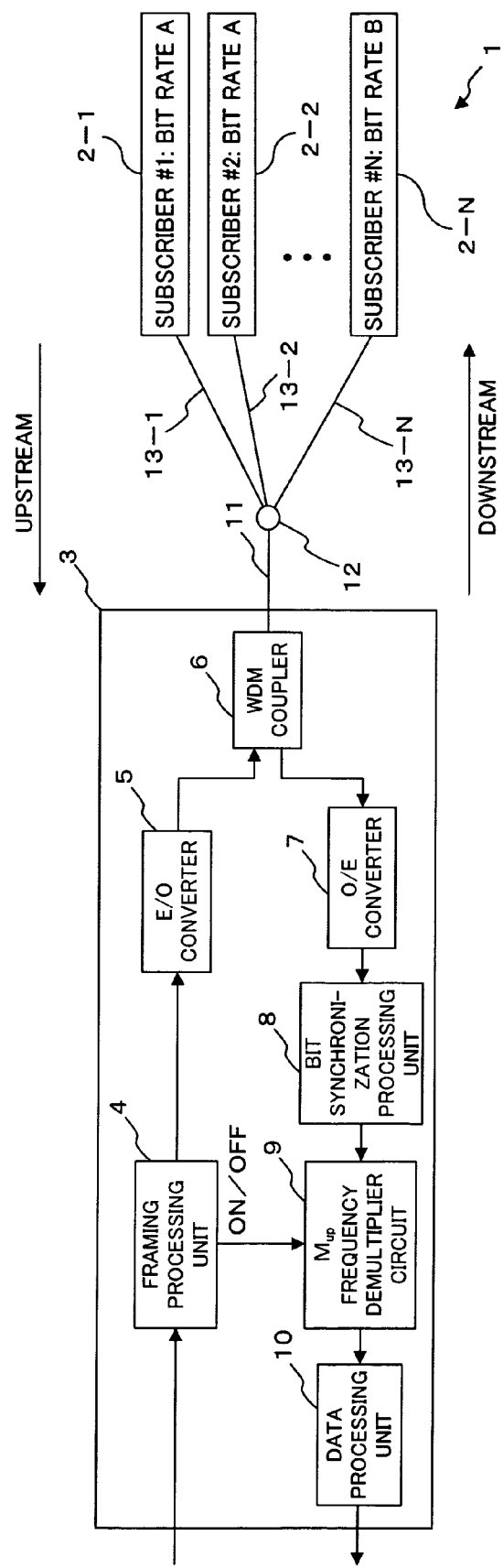
FIG. 1 is a block diagram showing a configuration of principal parts of a PON system (multi-bit-rate optical communication system) according to an embodiment of the present invention.

FIG. 1 is a block diagram showing a configuration of principal parts of a PON system (multi-bit-rate optical communication system) according to an embodiment of the present invention. A PON system 1 shown in FIG. 1 comprises an optical line terminal (hereinafter referred to as OLT) 3, N units of optical network unit (hereinafter referred to as ONU) 2-1 to 2-N (denoted simply as ONU 2 when not distinguished) corresponding to N (N is an integer equal to or greater than two) subscribers #1 to #N, a power splitter 12, an optical fiber 11 connecting the OLT 3 and the power splitter 12, and optical fibers 13-1 to 13-N (denoted simply as an optical fiber 13 when not distinguished) connecting the power splitter 12 and each ONU 2-1 to 2-N respectively.

Figure 2:
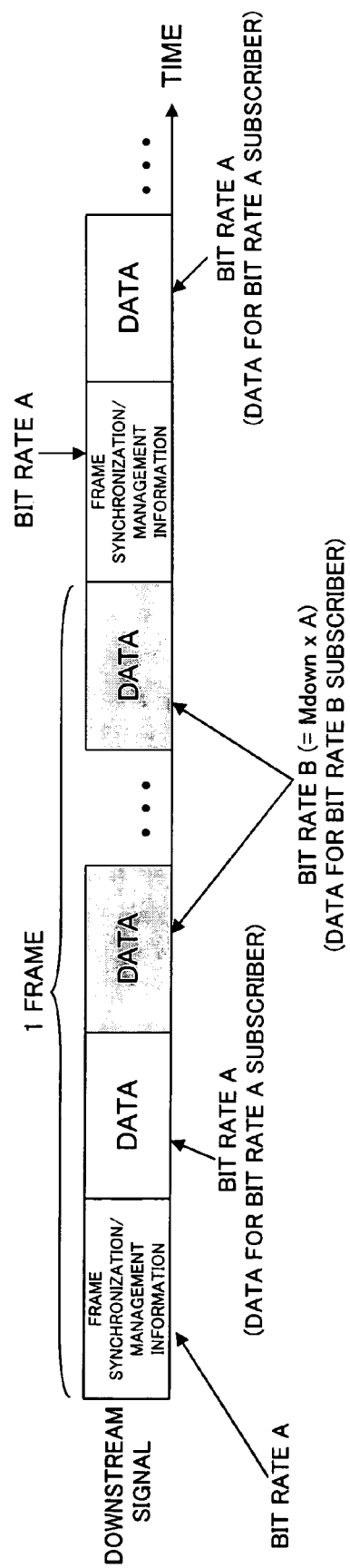
FIG. 2 is a diagram illustrating an example of a frame format.

Here, the OLT 3 has a function to transmit an optical signal (downstream frame) containing data of a plurality of different bit rates to the ONU 2 side. Note that, in a frame format used in this case, for example, as shown in FIG. 2, a first data area including frame synchronization information, management information, and data for low-speed subscribers #1 to #N−1 is transmitted at a bit rate A (first bit rate) and a second data area (See shaded areas) including data for a high-speed subscriber #N is transmitted at a different bit rate B ($=M_{down} \times A$; second bit rate) to the ONU 2 side.

Here, frame synchronization information has a predetermined frame synchronization pattern, and management information has at least information about a location (time slot) of a data signal addressed to each ONU 2 in a downstream frame format. Each ONU 2 can establish frame synchronization by detecting frame synchronization information and perform reception processing of a data signal addressed to own ONU 2 with correct reception timing by reading the management information. Incidentally, management information is also used by the OLT 3 to specify timing (transmission timing) for transmitting an upstream data signal to each ONU 2, each ONU 2 transmits an upstream data signal to the OLT 3 according to the timing, and thus the OLT 3 can perform reception processing normally, while avoiding collision of an upstream signal from each ONU. Here, in the frame format shown in FIG. 2, frame synchronization information and management information are stored in the same time slot, but each may also be stored in a different time slot.

The OLT 3 also has a function to perform reception processing of an upstream frame from each ONU 2 and a receiving operation clock thereof is a clock frequency corresponding to a bit rate B (=$M_{up}$×A) of upstream data from the ONU 2-N of high-speed subscriber #N.

The power splitter 12 is interposed between the optical fiber 11 and the optical fiber 13 and functions not only as a branching unit N-branching (power branching) a downstream frame from the OLT 3 into ONUs 2-1 to 2-N, but also as a multiplexing unit multiplexing and transmitting an upstream frame from each ONU 2 to the OLT 3.

The ONU 2 has not only a function to detect frame synchronization information contained in a downstream frame from the OLT 3 and to read out (selectively receive) data addressed to own ONU 2 by reading the management information based on the frame synchronization information, but also a function to transmit data addressed to the OLT 3 in an upstream direction according to timing specified in the management information by the OLT 3 in advance.

In the present embodiment, however, to simplify the description, it is assumed that ONUs 2-1 to 2-(N−1) (subscribers #1 to #N−1) are ONUs dedicated to low-speed data reception processing at a low bit rate A and the ONU 2-N (subscriber #N) is an ONU that can perform high-speed data reception processing at a high bit rate B. In addition, it is assumed that $M_{down}$=$M_{up}$=M>1 (That is, B=M×A).

The OLT 3 comprises, to achieve the aforementioned functions, when focused on principal parts thereof, for example as shown in FIG. 1, a framing processing unit 4, an electrical/optical (E/O) converter 5, a WDM coupler 6, an optical/electrical (O/E) converter 7, a bit synchronization processing unit 8, an $M_{up}$ frequency demultiplier circuit 9, and a data processing unit 10.

Here, the framing processing unit 4 is used for framing (time division multiplexing) downstream data for transmission (broadcasting) to each ONU 2 in the above-described format in FIG. 2 and generates a downstream frame addressed to each ONU 2, for example, from data at the low bit rate A addressed to ONUs 2-1 to 2-(N−1), data at the high bit rate B addressed to ONU 2-N, and a management information used for notifying the ONU 2 of (or specifying to the ONU 2) frame synchronization information in a downstream frame, a location (time slot) of data addressed to each ONU 2 in a downstream frame, data transmission timing (access timing by TDMA) in an upstream direction from the ONU 2 and the like. The framing processing unit 4 also has a function to perform ON/OFF control of an operation of an $M_{up}$ frequency demultiplier circuit 9, which will be described later.

The E/O converter 5 is used for E/O conversion from an electrical signal into an optical signal (for example, light in the 1.49 μm band) of a downstream frame generated by the framing processing unit 4.

The WDM coupler 6 is used to transmit a downstream frame E/O-converted by the E/O converter 5 to the optical fiber 11 and to demultiplex an upstream frame (for example, light in the 1.31 μm band) from the optical fiber 11 to the O/E converter 7.

The O/E converter 7 is used for O/E conversion from an optical signal into an electric signal of an upstream frame demultiplexed by the WDM coupler 6.

The bit synchronization processing unit 8 is used to perform reception processing of an upstream frame from the ONU 2 at a clock frequency corresponding to the high bit rate B (hereinafter referred to as a clock B) to bit-synchronize reception timing of data contained in the upstream frame with a reception processing operating clock of the OLT 3.

The $M_{up}$ frequency demultiplier circuit 9 is used to $M_{up}$ (=M)-demultiply the reception processing operating clock of the OLT 3. For example, the framing processing unit 4 turns on the $M_{up}$ frequency demultiplier circuit 9 at a time when bit-rate-A data is received to $M_{up}$-demultiply the reception operating clock (clock B) of the OLT 3, and the data processing unit 10 described later performs reception processing of bit-rate-A data in the $M_{up}$ bit period (once in every $M_{up}$ clock) of the clock B. Here, since the bit rate B is $M_{up}$ times the bit rate A, the clock B is also $M_{up}$ times a clock frequency corresponding to the bit rate A (hereinafter referred to as a clock A). That is, by ON control of the $M_{up}$ frequency demultiplier circuit 9, the data processing unit 10 operates with the clock A obtained by $M_{up}$-demultiplying the clock B for bit-rate-A data.

Meanwhile, since the framing processing unit 4 turns off an operation of the $M_{up}$ frequency demultiplier circuit 9 at a time when bit-rate-B data is received, the data processing unit 10 can correctly perform reception processing of bit-rate-B data by a bit as is (that is, the clock B). Here, the OLT 3 manages transmission timing (access timing) of upstream data of each ONU 2 and thus the OLT 3 keeps track of data reception timing at bit rates A and B without performing detection and establishment processing of upstream frame synchronization. In addition, when the above $M_{up}$ is an integer, the $M_{up}$ frequency demultiplier circuit 9 can be realized with a simple circuit configuration, thus enabling contribution to circuit scale restriction and cost reduction.

The data processing unit 10, as described above, is used to perform reception processing of bit-rate-A data using the clock A and bit-rate-B data using the clock B depending on an ON/OFF state of the $M_{up}$ frequency demultiplier circuit 9.

By configuring the OLT 3 in this manner, with the frame format shown in FIG. 2, it becomes possible to transmit data (first data area) addressed to low-speed ONUs 2-1 to 2-(N−1) at the bit rate A and data (second data area) addressed to the high-speed ONU 2-N at the bit rate B. Furthermore, reception processing of an upstream frame from each ONU 2 in which bit-rate-A data and bit-rate-B data are mixed can be performed, after establishing bit synchronization using the clock B by the common bit synchronization processing unit 8, by performing ON/OFF control of the $M_{up}$ frequency demultiplier circuit 9 so that reception processing of low-speed data at the bit rate A is received using the clock A ($M_{up}$ bit period) obtained by $M_{up}$-demultiplying the clock B and high-speed data at the bit rate B is received using the clock B as is in the period by a bit.

Figure 3:
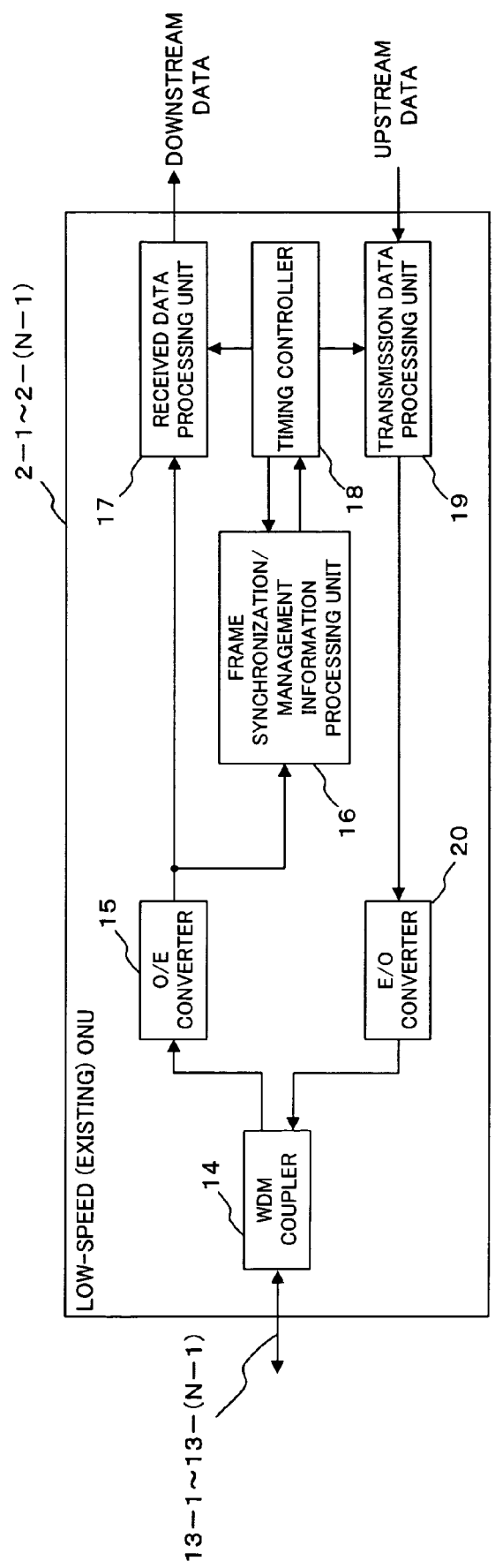
FIG. 3 is a block diagram showing the configuration of principal parts of an ONU according to an embodiment of the present invention.

Next, the ONU 2 will be described using FIGS. 3 and 4. FIG. 3 is a block diagram showing the configuration of principal parts of ONUs 2-1 to 2-(N−1) for low-speed subscribers #1 to #N−1 and FIG. 4 is a block diagram showing the configuration of principal parts of the ONU 2-N for the high-speed subscriber #N.

First, as shown in FIG. 3, each of the ONUs (hereinafter referred to as a low-speed or existing ONU) 2-1 to 2-(N−1) for low-speed subscribers #1 to #N−1 is comprised of, for example, a WDM coupler 14, an O/E converter 15, a frame synchronization/management information processing unit 16, a received data processing unit 17, a timing controller 18, a transmission data processing unit 19, and an E/O converter 20, and operates (reception processing) using the clock A as a basic operating clock thereof.

Figure 4:
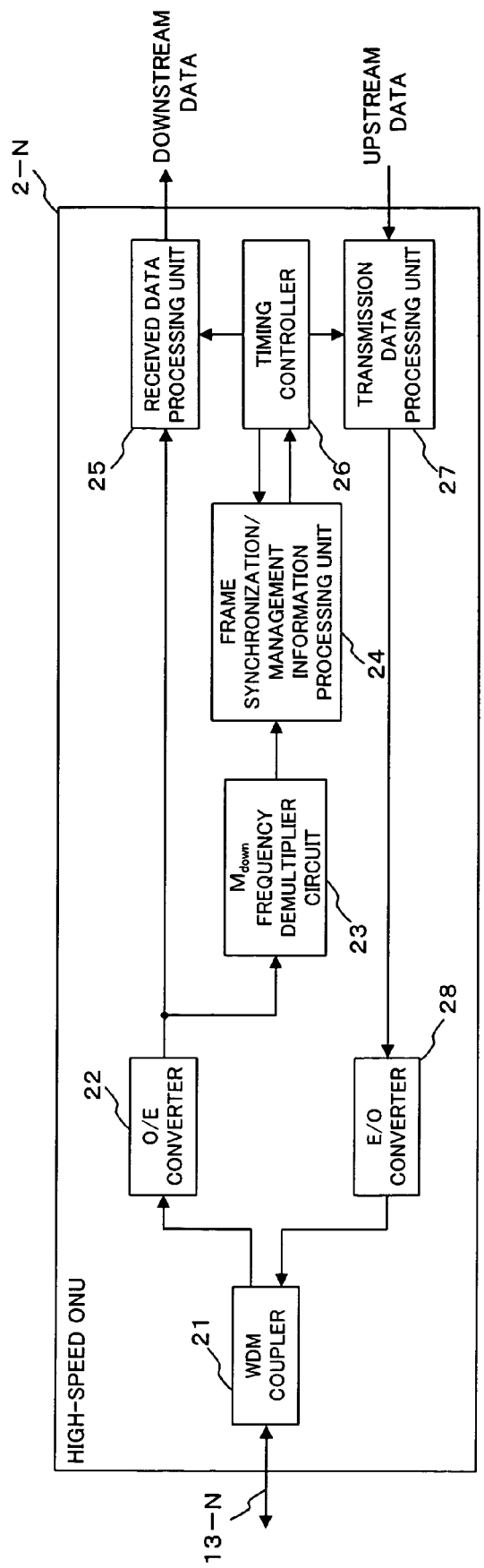
FIG. 4 is a block diagram showing the configuration of principal parts of the ONU according to an embodiment of the present invention.

On the other hand, as shown in FIG. 4, the ONU 2-N (hereinafter referred to as a high-speed ONU) for the high-speed subscriber #N is comprised of a WDM coupler 21, an O/E converter 22, an $M_{down}$ frequency demultiplier circuit 23, a frame synchronization/management information processing unit 24, a received data processing unit 25, a timing controller 26, a transmission data processing unit 27, and an E/O converter 28, and is different from the ONUs 2-1 to 2-(N−1) in that the high-speed ONU operates at the clock B and further comprises the $M_{down}$ frequency demultiplier circuit 23.

Here, in each of the ONUs 2-1 to 2-(N−1) shown in FIG. 3, the WDM coupler 14 is used for demultiplexing a downstream frame (light in the 1.49 μm band) from the optical fiber 13 to the O/E converter 15 and also for transmitting data (light in the 1.31 μm band) in an upstream direction from the E/O converter 20 to the optical fiber 13.

In addition, the O/E converter 15 is used for O/E conversion from an optical signal to an electrical signal of a downstream frame demultiplexed by the WDM coupler 14.

The frame synchronization/management information processing unit 16 is used for detecting frame synchronization information and management information contained in the first data area of the downstream frame, and the timing controller 18 is used to control reception processing timing by the received data processing unit 17 based on a data location in a frame addressed to own ONU of ONUs 2-1 to 2-(N−1) obtained from detected frame synchronization information and management information, and also to control transmission processing timing by the transmission data processing unit 19 based on transmission timing obtained from the management information when transmitting data to the OLT 3.

The received data processing unit 17 and the transmission data processing unit 19 are used, as described above, to perform data reception processing and data transmission processing according to controls from the timing controller 18 using the clock A, which is the basic operating clock of the ONUs 2-1 to 2-(N−1), respectively.

In addition, the E/O converter 20 is used for E/O conversion from an electrical signal into an optical signal of data in an upstream direction from the transmission data processing unit 19.

With the above-described configuration, the existing ONUs 2-1 to 2-(N−1) demultiplex a downstream frame transmitted from the OLT 3 via the optical fiber 13 through the WDM coupler 14 and then O/E-convert the downstream frame through the O/E converter 15.

Then, frame synchronization information and management information in the downstream frame are detected by the frame synchronization/management information processing unit 16 using the clock A, which is the basic operating clock of the ONUs 2-1 to 2-(N−1) and, based on the detected frame synchronization information, timing control of the received data processing unit 17 is performed by the timing controller 18 to extract downstream data by performing reception processing of a data signal addressed to own ONU of ONUs 2-1 to 2-(N−1) with proper reception timing.

On the other hand, upstream data from the user is transmitted to the OLT 3 with proper transmission timing when the timing controller 18 performs timing control on the transmission data processing unit 19 based on the detected management information. The upstream data is E/O-converted by the E/O converter 20, multiplexed by the WDM coupler 14 to the optical fiber 13, and transmitted to the OLT 3.

By configuring the ONUs 2-1 to 2-(N−1) in this manner, reception processing of only bit-rate-A data addressed to own ONU of ONUs 2-1 to 2-(N−1) can correctly (normally) be performed without performing reception processing of bit-rate-B data in a downstream frame transmitted from the OLT 3.

In addition, since normally reception processing is performed with proper timing according to frame synchronization information, only a data signal addressed to own ONU 2 is received. However, even though no frame synchronization information can be detected for some reason, the ONUs 2-1 to 2-(N−1) operating with the clock A can recognize bit-rate-B data only as noise.

Therefore, bit-rate-A data can correctly (normally) be received even though bit-rate-A data and bit-rate-B data are mixed within a downstream frame without making any change (upgrade, equipment renewal) at all to the existing ONUs 2-1 to 2-(N−1) for the bit rate A.

On the other hand, the high-speed ONU shown in FIG. 4 is comprised of, for example, the WDM coupler 21, the O/E converter 22, the $M_{down}$ frequency demultiplier circuit 23, the frame synchronization/management information processing unit 24, the received data processing unit 25, the timing controller 26, the transmission data processing unit 27, and the E/O converter 28, and operates (reception processing) using the clock B as its basic operating clock.

Here, the WDM coupler 21, the O/E converter 22, and the E/O converter 28 are similar to the aforementioned WDM coupler 14, the O/E converter 15, and the E/O converter 20.

The $M_{down}$ frequency demultiplier circuit 23 is used to $M_{down}$-demultiply the basic operating clock (clock B) of the high-speed ONU 2-N, and the frame synchronization/management information processing unit 24 is used to detect frame synchronization information and management information contained in the first data area of a downstream frame. That is, with collaboration of the $M_{down}$ frequency demultiplier circuit 23 and the frame synchronization/management information processing unit 24, they perform reception processing of a downstream frame from the O/E converter 22 in the $M_{down}$ bit period (at the rate once every $M_{down}$-bit) and function as a frame synchronization processing unit to detect frame synchronization information and management information contained in the first data area in the frame format.

The timing controller 26 is used to control reception processing timing by the received data processing unit 25 based on a data location in a frame addressed to own ONU 2-N obtained from the detected frame synchronization information and management information, and also to control transmission processing timing by the transmission data processing unit 27 based on transmission timing obtained from the management information when transmitting data to the OLT 3.

The received data processing unit 25 and the transmission data processing unit 27 are used, as described above, to perform data reception processing and data transmission processing according to controls from the timing controller 26 using the clock B, which is the basic operating clock of ONU 2-N, respectively.

With the above-described configuration, the high-speed ONU 2-N demultiplexes a downstream frame transmitted from the OLT 3 via the optical fiber 13 through the WDM coupler 21 and then O/E-converts the downstream frame through the O/E converter 22.

Then, the $M_{down}$ frequency demultiplier circuit 23 $M_{down}$-demultiplies the clock B, which is the basic operating clock of the ONU 2-N, and thereby the frame synchronization/management information processing unit 24 detects frame synchronization information and management information in the downstream frame in the $M_{down}$ bit period (that is, the clock A). Thus, the timing controller 26, based on the detected frame synchronization information, performs timing control on the received data processing unit 25 to extract downstream data by performing reception processing of a data signal addressed to own ONU 2-N with proper reception timing.

On the other hand, upstream data from the user is transmitted to the OLT 3 with proper transmission timing when the timing controller 26 performs timing control on the transmission data processing unit 27 based on the detected management information. The upstream data is E/O-converted by the E/O converter 28, multiplexed by the WDM coupler 21 to the optical fiber 13, and transmitted to the OLT 3.

Since, by including the $M_{down}$ frequency demultiplier circuit 23, as described above, the ONU 2-N can also perform reception processing of a data signal at the bit rate A (such as frame synchronization information and management information), it becomes possible to correctly (normally) perform reception processing of high-bit-rate B data.

Figure 5:
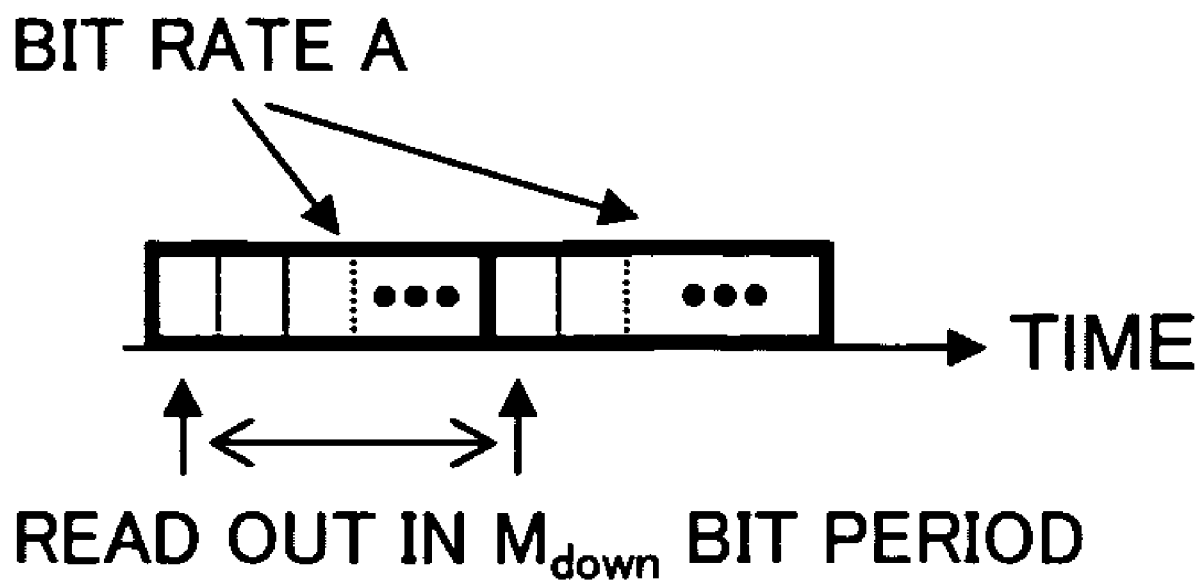
FIG. 5 is a schematic diagram showing reception processing timing in the ONU according to an embodiment of the present invention.

Here, an operation of the $M_{down}$ frequency demultiplier circuit 23 will be described using FIG. 5. FIG. 5 is a schematic diagram showing reception processing timing of the high-speed ONU 2-N.

The high-speed ONU 2-N operates (reception processing) using the clock B as a basic operating clock thereof. This is because of reception processing of bit-rate-B data transmitted to own ONU 2-N from the OLT 3. However, for example, since low-speed data containing frame synchronization information and management information is transmitted as bit-rate-A data, reception processing of low-speed (bit rate A) data cannot be normally performed if the clock B is used directly.

Thus, by $M_{down}$-demultiplying the clock frequency of the ONU 2-N, the $M_{down}$ frequency demultiplier circuit 23 generates a clock frequency (clock A) corresponding to the bit rate A based on the clock frequency (clock B) corresponding to the bit rate B (=M×A). This makes it possible, as shown in FIG. 5, to provide reception processing timing in the $M_{down}$ bit period for bit-rate-A data so that reception processing of low-speed data at the bit rate A can correctly (normally) be performed.

That is, by performing reception processing of a downstream frame in the $M_{down}$ bit period (that is, the clock A) using the $M_{down}$ frequency demultiplier circuit 23 and the frame synchronization/management information processing unit 24, the high-speed ONU 2-N performs reception processing of frame synchronization information and management information to establish frame synchronization, and performs reception processing of data addressed to own ONU 2-N identified based on the management information through the received data processing unit 25 by a bit (clock B).

In the PON system according to the present embodiment, as described above, the OLT 3 transmits the first data area including frame synchronization information in a frame format at the first bit rate (A) and transmits the second data area at the second bit rate (B) which is the first bit rate (A)×$M_{down}$ ($M_{down}$>1), any of ONU 2 (for example, ONU 2-N) performs reception processing of an optical signal thereof in the $M_{down}$ bit period (at the rate once every $M_{down}$-bit) to detect the frame synchronization information in the first data area in the frame format, and performs, based on detection timing thereof, reception processing of the second data area in the frame format by a bit. Thus, the ONU 2-N upgraded for receiving bit-rate-B data can correctly perform reception processing of data addressed to own ONU 2-N at the bit rate B through simple reception processing in the $M_{down}$ bit period without requiring complex rate conversion processing of frame synchronization information at the bit rate A. Therefore, by upgrading only the ONU 2-N that requires a service at the bit rate B while leaving ONUs 2-1 to 2-(N−1) for which an optical signal (service) at the bit rate A is sufficient (in other words, bit-rate-B data is not needed) as they are (without upgrading), communication in which an optical signal at the bit rate A and that at the bit rate B are mixed in the frame format can easily be realized, enabling significant reduction in costs of upgrading the ONU 2 and labor required for the upgrade.

Moreover, since the upgraded ONU 2-N can normally process a signal at the bit rate A by reception processing in the $M_{down}$ bit period, compatibility with existing systems can also be maintained. If the $M_{down}$ is an integer, the bit rate B can be an integral multiple of the bit rate A. This can realize the $M_{down}$ frequency demultiplier circuit 23 (frame synchronization processing unit) with a simple circuit configuration, thereby enabling contribution to circuit scale restriction and cost reduction.

Moreover, the OLT 3 performs reception processing of an optical signal from the WDM coupler 6 at the clock frequency corresponding to bit rate B to establish bit synchronization and performs reception processing of an optical signal of the bit rate A at a rate once every $M_{up}$-bit and the optical signal at the bit rate B by a bit based on predetermined transmission timing for each of the ONU 2. In this way, it becomes possible to correctly perform processing of the optical signals at the bit rate A and the bit rate B from each ONU 2 with simple configuration without establishing bit synchronization of each optical signals of a different rate.

Next, variants of the PON system (multi-bit-rate optical communication system) in the present embodiment will be described using FIGS. 6 to 17.

[B] Description of the First Variant

Figure 6:
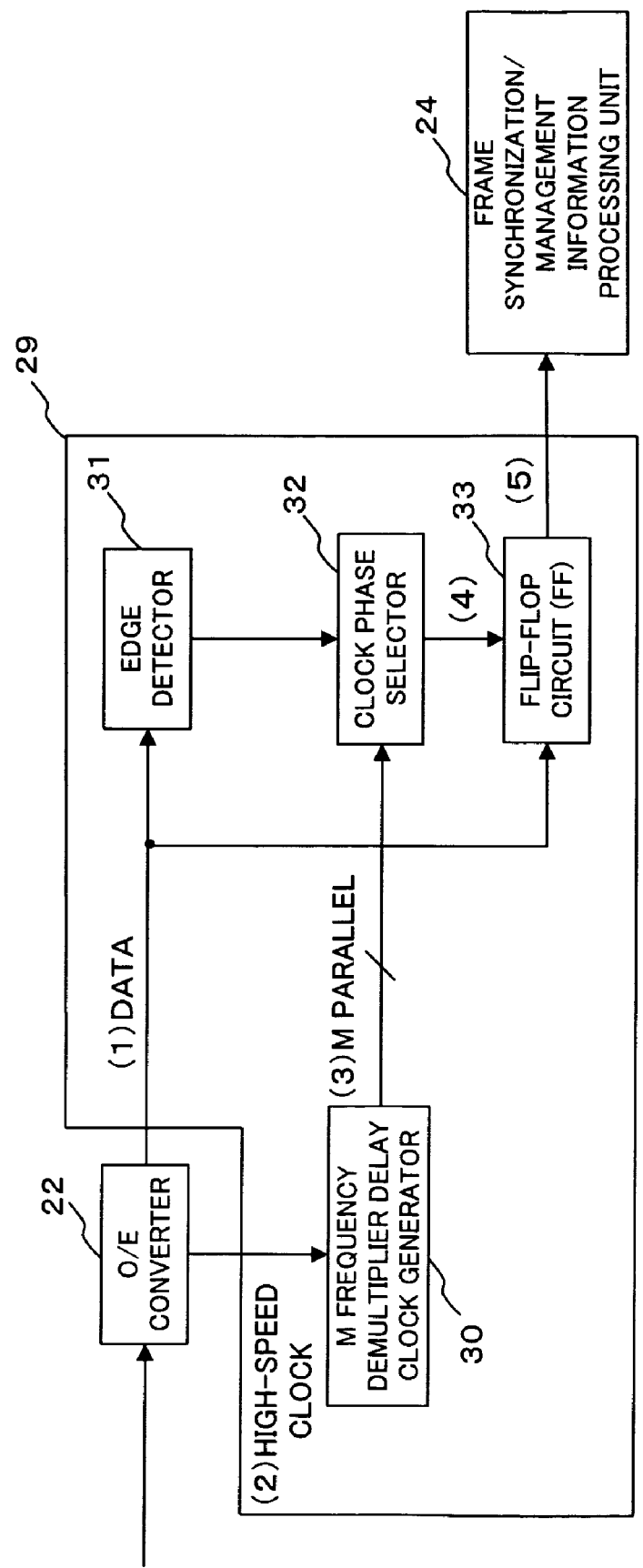
FIG. 6 is a block diagram showing the configuration of a frame synchronization processing unit according to a first variant of the present invention.

In the first variant, as shown in FIG. 6, instead of the $M_{down}$ frequency demultiplier circuit 23 in the high-speed ONU 2-N, an edge detecting M frequency demultiplier circuit 29 is used.

The edge detecting M frequency demultiplier circuit 29 shown in FIG. 6 detects an edge of a received data signal (rising part of a data signal), generates a clock A with a plurality of phases by demultiplying the clock B, and performs reception processing of bit-rate-A data according to an optimal-phase clock A, and thus is comprised, for example, of an M frequency demultiplier delay clock generator 30, an edge detector 31, a clock phase selector 32, and a flip-flop circuit (FF) 33. Signals of (1) to (5) shown in FIG. 6 correspond to those of (1) to (5) shown in FIG. 7 respectively.

Here, the M frequency demultiplier delay clock generator 30 is used to demultiply the high-speed clock (B) (2) from the O/E converter 22 and to generate M parallel low-speed clocks (3) with different phases each phase-retarded by 1/M period.

The edge detector 31 is used to detect an edge of a data signal (DATA) (1) from the O/E converter 22.

The clock phase selector (controller) 32 is used to control reception processing start timing for performing reception processing in the $M_{down}$-bit period based on edge detection timing by the edge detector 31, and to select from M parallel low-speed clocks (3) generated by the M frequency demultiplier delay clock generator 30 an FF input clock (4) with an optimal phase for reception processing of the data signal (1), that is, a clock whose rise coincides with timing when the data signal (1) is near the center thereof.

Then, the FF 33 is used to read out the data signal (1) using the FF input clock (4) selected above and to output a read-out FF output DATA signal (5) to the frame synchronization/management information processing unit 24.

Figure 7:
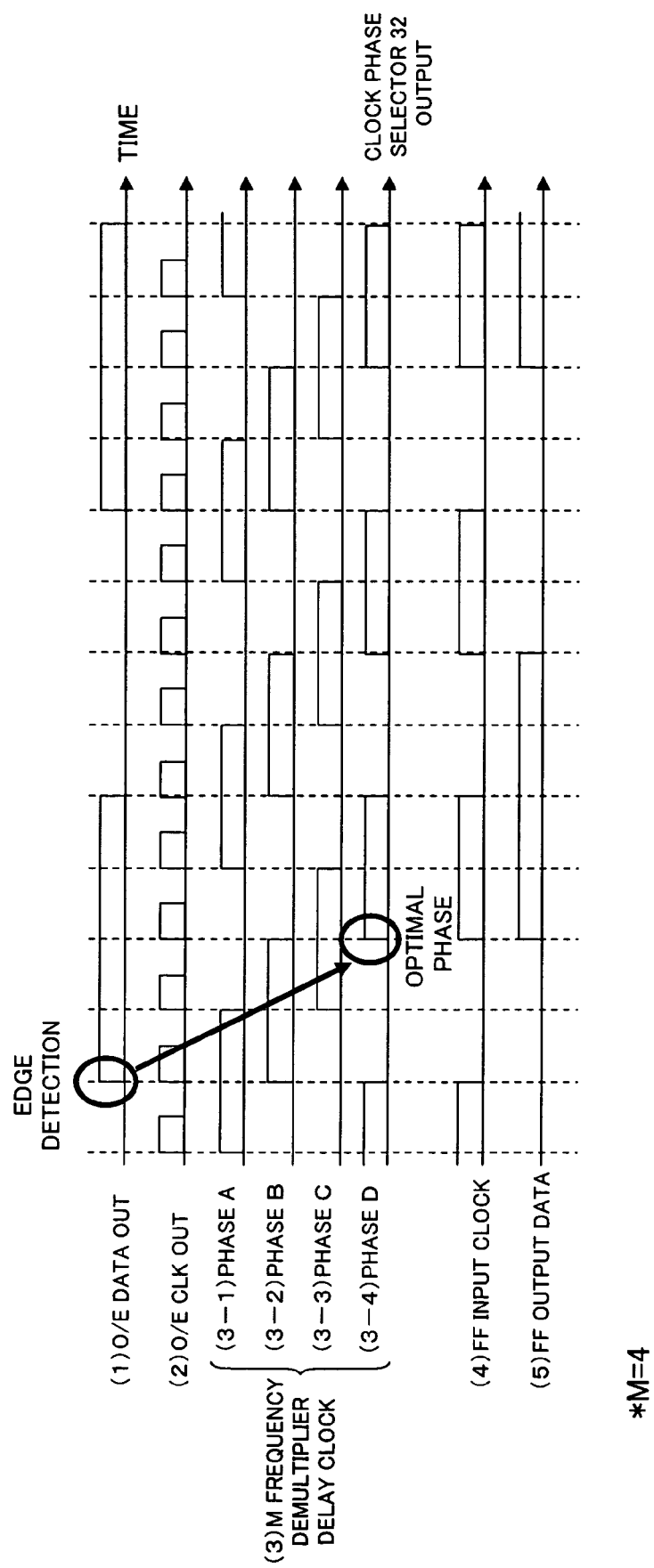
FIG. 7 is a timing chart of each signal input/output from/to an edge detecting M frequency demultiplier circuit shown in FIG. 6.

Here, an operation of the above-described edge detecting M frequency demultiplier circuit 29 when, for example, M=4 will be described using FIG. 7.

First, the edge detector 31 detects an edge of a data signal (O/E Data out) (1) from the O/E converter 22, and then the M frequency demultiplier delay clock generator 30 demultiplies the high-speed clock (O/E CLK out) (2) from the O/E converter 22, that is, the clock B to generate M parallel low-speed clocks (M frequency demultiplier delay clock) (3), that is, M parallel clocks A (phase A to phase D) (3-1) to (3-4) whose phase has a difference of 1/M period from each other.

Next, the clock phase selector 32 selects here a phase D clock as readout timing for the data signal (1) so that reception processing is started with timing (optimal reception timing) after specific phases from the edge detected by the edge detector 31. By selecting the phase D clock as the optimal phase, even though a timing shift occurs in readout processing for some reason, a possibility of failing in readout processing can be minimized because a phase D clock rise coincides with timing when the data signal (1) is near the center thereof.

Also, even if the data signal (1) is delayed, readout processing can always be successfully performed with a high probability because the clock phase selector 32 selects each time an FF input clock (4) to provide optimal readout timing.

Note that, if a data delay related to data readout processing should be suppressed in return for a high probability of successful data readout processing, another clock, for example, a phase C clock may be selected as the optimal phase.

Then, the data signal (1) entered in the FF circuit 33 is read out by the phase D clock (FF input clock) (4) selected in the clock phase selector 32 and outputted to the frame synchronization/management information processing unit 24 as the FF output DATA signal (5).

By constructing a frame synchronization processing unit with the edge detecting M frequency demultiplier circuit 29 having the edge detector 31 and the clock phase selector (controller) 32, as described above, it becomes possible to optimize start timing of the reception processing easily so that reception processing of bit-rate-A data can normally be performed in the $M_{down}$ bit period, that is, using the clock A (=B/M) in the high-speed ONU 2-N operating with the clock B.

Additionally, the edge detecting M frequency demultiplier circuit 29 may be used in place of not only the $M_{down}$ frequency demultiplier circuit 23 of the ONU 2-N, but also the $M_{up}$ frequency demultiplier circuit 9 of the OLT 3.

[C] Description of the Second Variant

Figure 8:
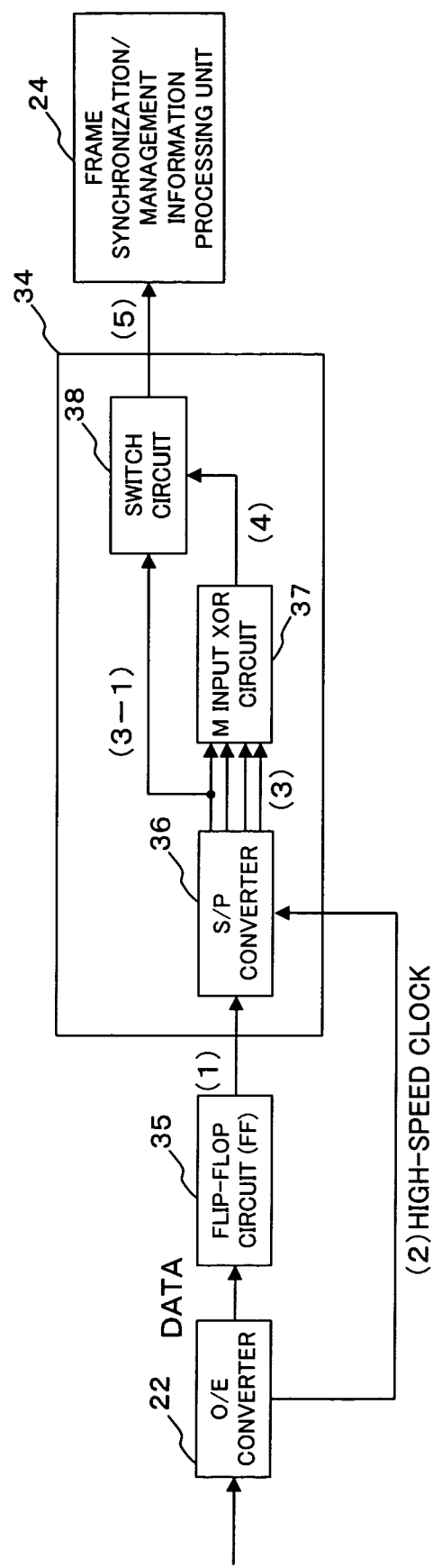
FIG. 8 is a block diagram showing the configuration of a frame synchronization processing unit according to a second variant of the present invention.

In the second variant, instead of the above-described $M_{down}$ frequency demultiplier circuit 23, for example, a same code detecting M frequency demultiplier circuit 34 and a flip-flop circuit (FF) 35, as shown in FIG. 8, are used. Here, signals of (1) to (5) and (3-1) shown in FIG. 8 correspond to those of (1) to (5) and (3-1) in the timing chart shown in FIG. 9 respectively.

Here, the same code detecting M frequency demultiplier circuit 34 is used to output only low-speed data to the frame synchronization/management information processing unit 24 using a fact that same code data is continuously detected when reception processing of a low-speed (bit rate A) data signal is performed using the clock B, and thus is comprised of a serial/parallel (S/P) converter 36, an M input XOR (exclusive OR) circuit 37, and a switch circuit 38.

The flip-flop circuit (FF) 35 is used to temporarily hold a data signal (DATA) from the O/E converter 22 before transmitting it to the S/P converter 36 in a succeeding stage.

The serial/parallel converter 36 is used to convert a data signal (1) from the FF circuit 35 from serial to parallel based on a high-speed clock (2) from the O/E converter 22 to generate M parallel data signals (3).

The M input XOR circuit 37 is used to output a control signal (4) for ON/OFF control of the switch circuit 38 in the succeeding stage depending on each value of the M parallel data signals (3) generated by the S/P converter 36, and functions as a same code continuing detector to detect an M(=$M_{down}$)-bit same code continuing portion by performing reception processing of the data signal using the clock B. For example, a control signal (here 0) to turn on the switch circuit 38 is outputted only when values from the S/P converter 36 are all the same (all 0s or 1s), and otherwise, a control signal (here 1) to turn off the switch circuit 38 is outputted.

The ON/OFF state of the switch circuit 38 is switched according to the (4) ON/OFF control signal from the M input XOR circuit 37 and only when it is ON, part (3-1) of output of the S/P converter 36 is outputted to the frame synchronization/management information processing unit 24 in the succeeding stage. That is, a block composed of the M input XOR circuit 37 and the switch circuit 38 functions as a frame synchronization detector to detect frame synchronization information by performing reception processing of the same code continuing portion detected by the same code continuing detector at the rate once every $M_{down}$-bit.

Here, an operation of the same code detecting M frequency demultiplier circuit 34 when, for example, M=4 will be described using FIG. 9.

Figure 9:
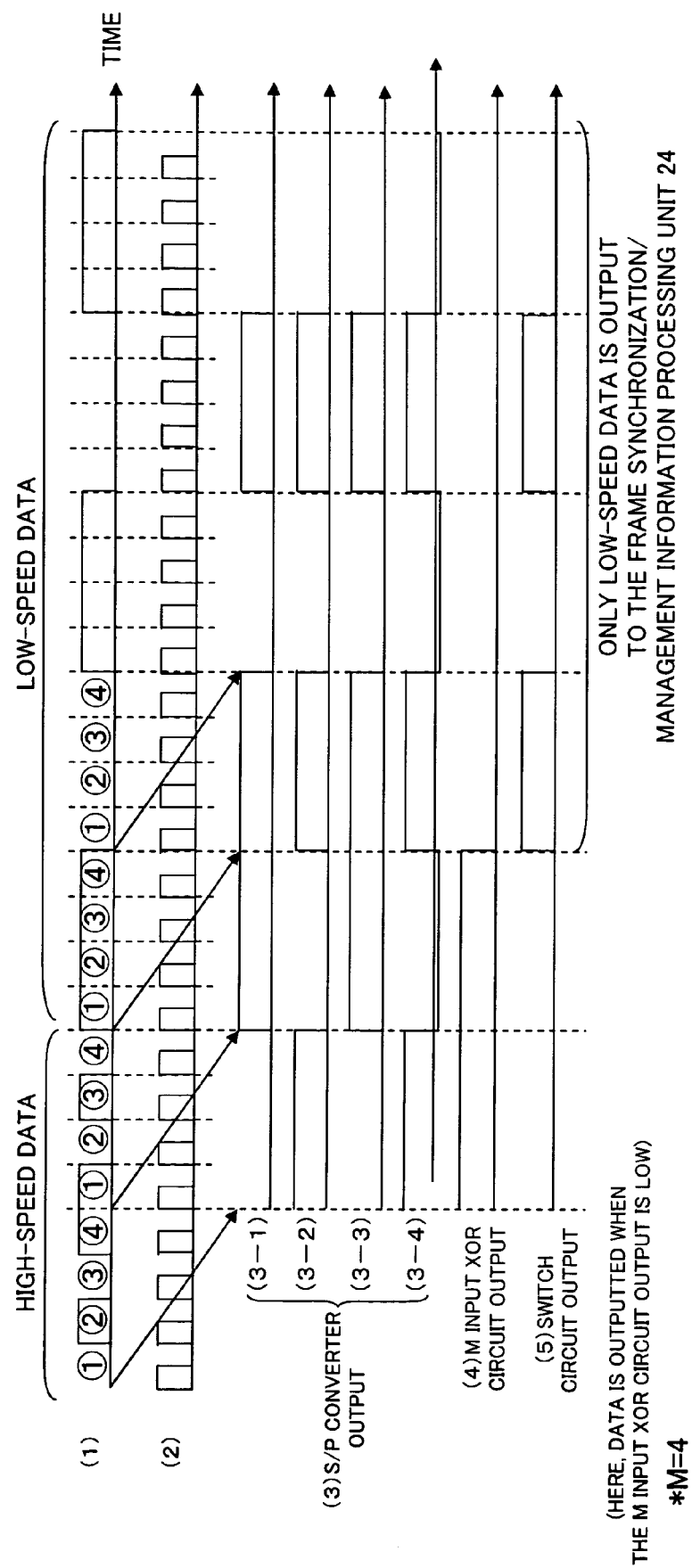
FIG. 9 is a timing chart of each signal input/output from/to a same code detecting M frequency demultiplier circuit shown in FIG. 8.

First, when (0, 1, 0, 1) is outputted as high-speed DATA (bit-rate-B data) (1) from the O/E converter 22, M parallel data signals (3) generated by the S/P converter 36 become (0, 1, 0, 1) ((3-1) to (3-4)) corresponding to circled numbers 1 to 4 in FIG. 9 respectively.

Since, at this point, values from the S/P converter 36 are not all the same, the M input XOR circuit 37 outputs one as the ON/OFF control signal (4), and since the ON/OFF control signal (4) from the M input XOR circuit 37 is one, switch output (5) becomes OFF and the switch circuit 38 transmits no data to the frame synchronization/management information processing unit 24 in the succeeding stage.

Next, when (1, 0, 1, 0) is outputted as the high-speed DATA (1) from the O/E converter 22, M parallel data signals (3) generated by the S/P converter 36 become (1, 0, 1, 0) ((3-1) to (3-4)) corresponding to the circled numbers 1 to 4 in FIG. 9 respectively.

Since, also in this case, values from the S/P converter 36 are not all the same, the M input XOR circuit 37 outputs one as the ON/OFF control signal (4), the switch output (5) of the switch circuit 38 becomes OFF, and transmits no data to the frame synchronization/management information processing unit 24 in the succeeding stage.

Here, when same code continuing data of (1, 1, 1, 1) is outputted as low-speed DATA (bit-rate-A data) (1) from the O/E converter 22, M parallel data signals (3) generated by the S/P converter 36 become (1, 1, 1, 1) ((3-1) to (3-4)) corresponding to the circled numbers 1 to 4 in FIG. 9 respectively.

Since, at this point, values from the S/P converter 36 are all the same, the M input XOR circuit 37 outputs zero as an ON/OFF control signal (4), and since the ON/OFF control signal (4) from the M input XOR circuit 37 is zero, the switch circuit 38 outputs as the switch output (5), for example, one of (3-1) to the frame synchronization/management information processing unit 24 in the succeeding stage.

Similarly, if same code continuing data of (0, 0, 0, 0) is outputted as the low-speed DATA (1) from the O/E converter 22, M parallel data signals (3) generated by the S/P converter 36 become (0, 0, 0, 0) ((3-1) to (3-4)) corresponding to the circled numbers 1 to 4 in FIG. 9 respectively.

Since, also in this case, values from the S/P converter 36 are all the same, the M input XOR circuit 37 outputs zero as the ON/OFF control signal (4), and since the ON/OFF control signal (4) from the M input XOR circuit 37 is zero, the switch circuit 38 outputs, for example, zero of (3-1) as the switch circuit output (5) to the frame synchronization/management information processing unit 24 in the succeeding stage.

By constructing a frame synchronization processing unit with the same code detecting M frequency demultiplier circuit 34 having the M input XOR circuit 37 (same code continuing detector) and a frame synchronization detector, it becomes possible to realize a frame synchronization processing unit with a simple circuit configuration.

That is, data can be outputted to the frame synchronization/management information processing unit 24 in the succeeding stage only when same code continuing data is detected by the same code detecting M frequency demultiplier circuit 34, and therefore only a low-speed (bit-rate-A) data signal can be outputted to the frame synchronization/management information processing unit 24. This enables reception processing of bit-rate-A data using the clock A also in the ONU 2-N operating using the clock B.

Incidentally, the same code detecting M frequency demultiplier circuit 34 may also be used in place of not only the $M_{down}$ frequency demultiplier circuit 23 of the high-speed ONU 2-N, but also the $M_{up}$ frequency demultiplier circuit 9 of the OLT 3.

[D] Description of the Third Variant

Next, a PON system (multi-bit-rate optical communication system) in which forward error correction (FEC) code is applied will be described.

Due to performance of an optical receiving circuit, a transmission error rate generally increases, compared with data at a smaller transmission rate, when receiving data at high transmission rate (bit rate).

Figure 10:
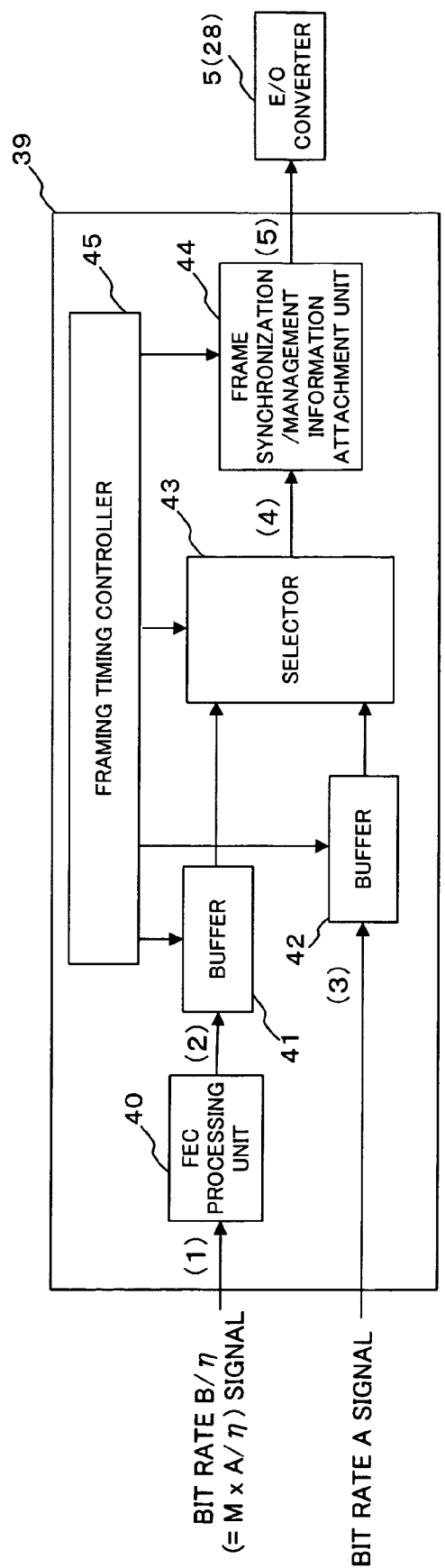
FIG. 10 is a block diagram showing the configuration of an FEC added framing processing unit according to a third variant of the present invention.

Thus, in the third variant, data is transmitted and received by adding FEC redundant bits of redundancy η to a high-speed (bit-rate-B) data signal. FIG. 10 is a block diagram showing the configuration of an FEC added framing processing unit according to the third variant.

An FEC framing processing unit 39 shown in FIG. 10 is provided in the OLT 3 and is used, for example, to generate a downstream frame by adding FEC redundant bits to bit-rate-B data, and thus is comprised of an FEC processing unit 40, buffers 41 and 42, a selector 43, a frame synchronization/management information attachment unit 44, and a framing timing controller 45. Signals of (1) to (5) shown in FIG. 10 correspond to those of (1) to (5) shown in FIG. 11 respectively.

Here, the FEC processing unit 40 is used to generate a data signal with FEC redundant bits (2) at the bit rate B by adding the FEC redundant bits of redundancy η to a data signal (1) at the bit rate B/η (=M×A/η). The redundancy η here indicates a length of data after adding the FEC redundant bits when the length of original data is defined to be one. In addition, in the present example, the bit rate of the data signal before adding the FEC redundant bits is preliminarily defined to be B/η to produce the bit rate B of the data signal after adding the FEC redundant bits.

Then, the buffer 41 is used to temporarily hold the data signal with FEC redundant bits (2) at the bit rate B, and the buffer 42 is used to temporarily hold a data signal (3) at the bit rate A.

The selector 43 is used to output each data signal from the buffers 41 and 42 as a serial signal (4) by rearranging the data signal in accordance with a timing signal from the framing timing controller 45.

The frame synchronization/management information attachment unit 44 is used to output a downstream frame (5) after adding frame synchronization information and management information to the serial signal (4) from the selector 43.

Then, the framing timing controller 45 is used to notify the buffers 41 and 42, the selector 43, and the frame synchronization/management information attachment unit 44 of a timing signal for generating the downstream frame (5) shown in FIG. 2.

Figure 11:
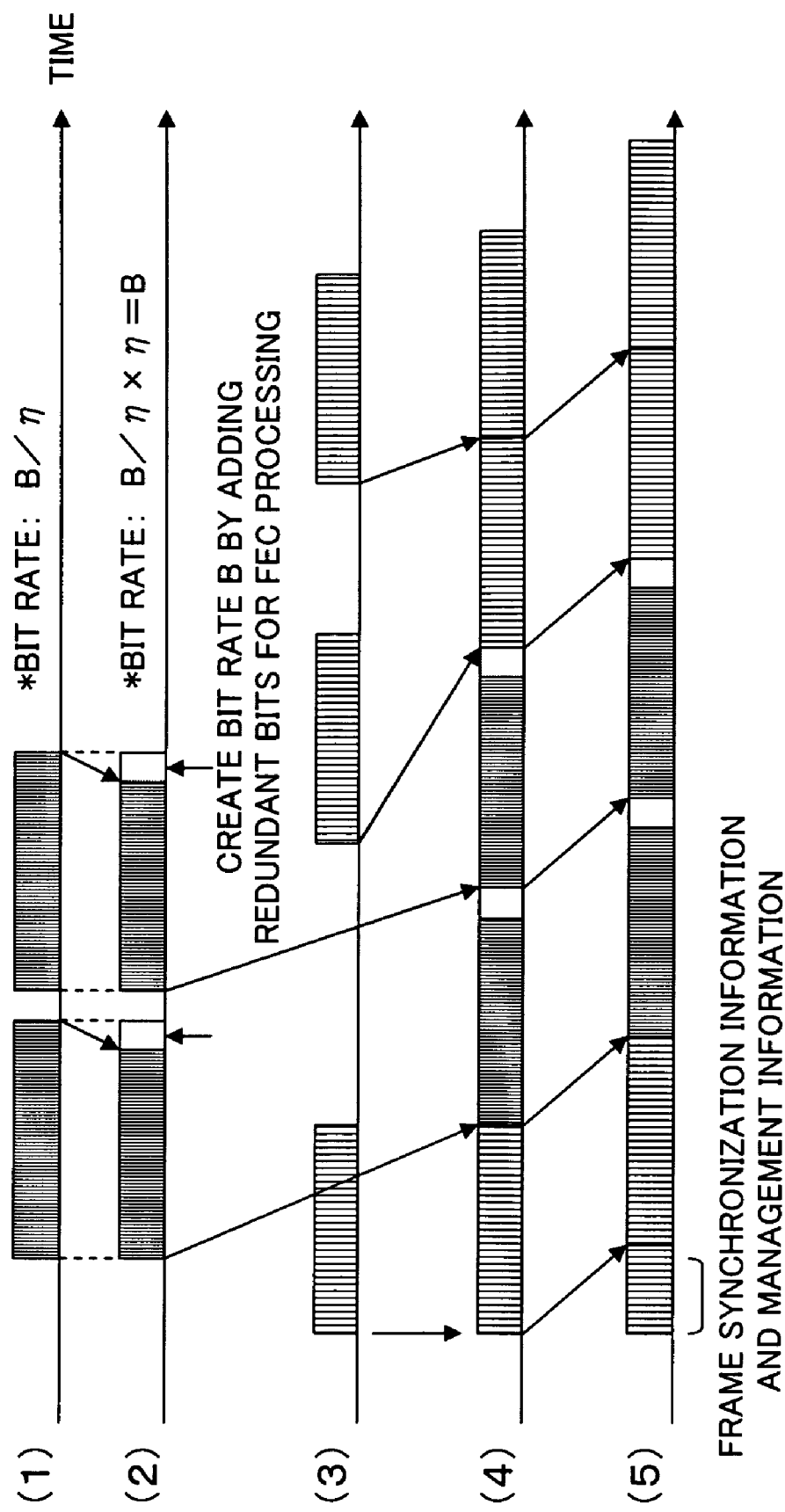
FIG. 11 is a schematic diagram for illustrating an operation of an FEC framing processing unit shown in FIG. 10.

Here, an operation of the above-described FEC framing processing unit 39 will be described using FIG. 11.

First, a data signal with FEC redundant bits (2) at the bit rate B is generated by the FEC processing unit 40 by adding FEC redundant bits to a data signal (1) at the bit rate B/η.

Then, after the data signal with FEC redundant bits (2) at the bit rate B and a data signal (3) at the bit rate A are held in the buffers 41 and 42, data shown by (2) and data shown by (3) are selected (rearranged) by the selector 43 based on a timing signal from the framing timing controller 45 to output a serial signal (4).

Next, a downstream frame (5) is generated by the frame synchronization/management information attachment unit 44 by adding frame synchronization information and management information to a group of data of (4).

By providing the FEC framing processing unit 39 on the OLT 3 side, as described above, FEC redundant bits can be added to a high-speed (bit-rate-B) data signal, which is more vulnerable to errors than a low-speed (bit-rate-A) data signal, for transmission, thus enabling transmission of a high-speed data signal while controlling an error rate.

In this case, an FEC decoder (not shown) for performing FEC decode processing of a data signal with FEC redundant bits at the bit rate B is naturally provided on the high-speed ONU 2-N side.

Also, the FEC processing unit 40 for upstream data may be provided on the high-speed ONU 2-N side, and in this case, FEC redundant bits will be added to upstream data from the ONU 2-N and an FEC decoder (not shown) for performing FEC decode processing is provided on the OLT 3 side.

Figure 12:
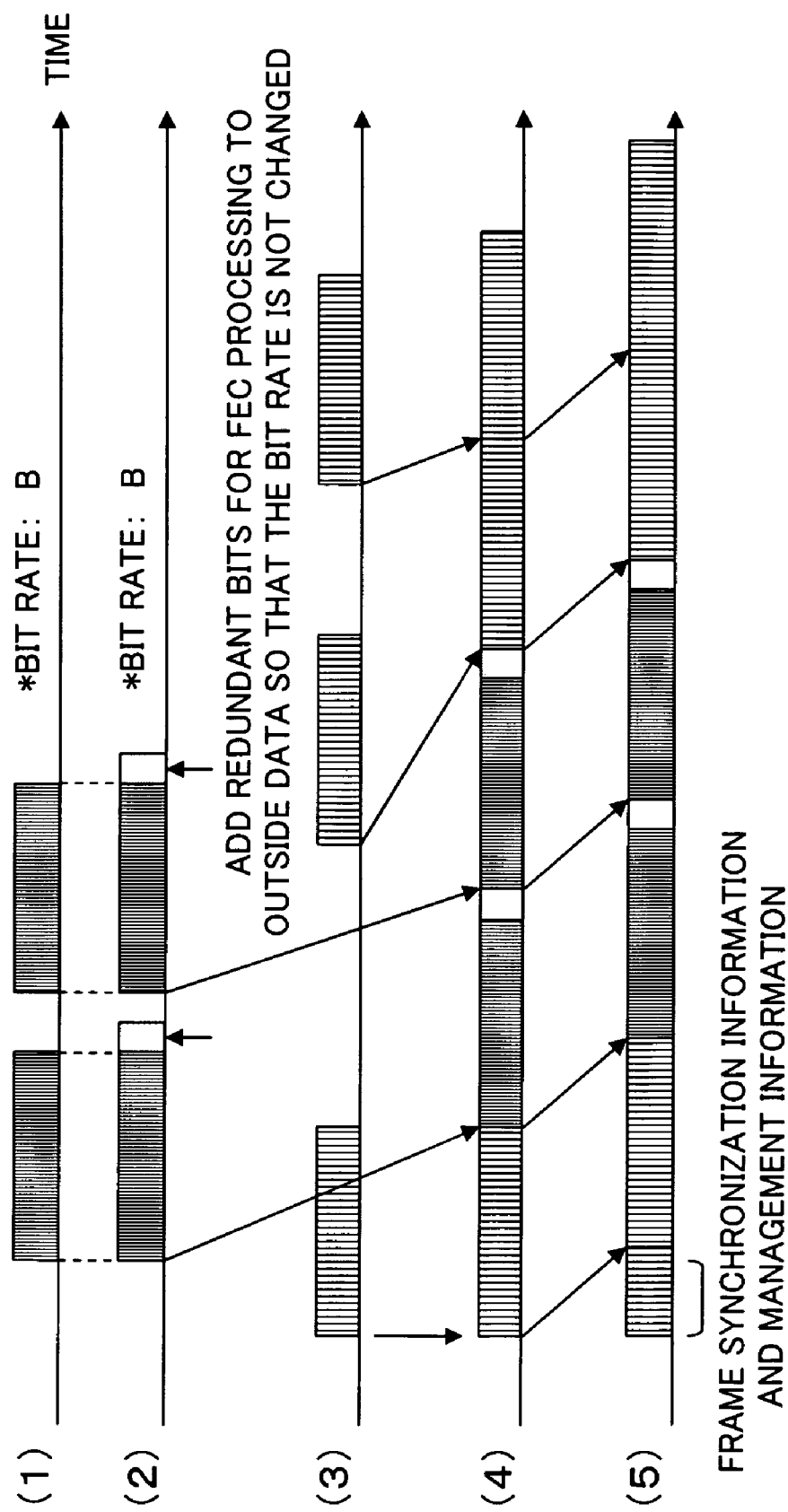
FIG. 12 is a schematic diagram for illustrating another operation of the FEC framing processing unit shown in FIG. 10.

In the FEC processing unit 40 described above, a data signal at the bit rate B is generated by adding FEC redundant bits to a data signal at the bit rate B/η in advance so that the data signal is contained within a predetermined time slot. However, as shown in FIG. 12, for example, a data signal with FEC redundant bits can also be generated without changing the bit rate between before and after adding the FEC redundant bits. Signals of (1) to (5) shown in FIG. 12 correspond to those of (1) to (5) shown in FIG. 10 respectively.

That is, in this case, data (1) at the bit rate B is input into the FEC processing unit 40 in advance and FEC redundant bits are added to a data signal thereof to generate a data signal with FEC redundant bits (2) to be outputted to the buffer 41. Then, thereafter, like the data flow described above, after the data signal with FEC redundant bits (2) and a data signal (3) at the bit rate A are held in the buffers 41 and 42, data shown by (2) and data shown by (3) are selected (rearranged) by the selector 43 based on a timing signal from the framing timing controller 45 to output a serial signal (4).

Next, a downstream frame (5) is generated by the frame synchronization/management information attachment unit 44 by adding frame synchronization information and management information to a group of data of (4).

Since, in this case, a data signal with FEC redundant bits whose data length is longer than that of original data is generated in the FEC processing unit 40, timing control by the framing timing controller 45 is performed by taking the data length of a data signal at the bit rate B into consideration.

Note that, such an FEC processing unit 40 may naturally be provided on the ONU 2-N side.

[E] Description of the Fourth Variant

As described above, data at a greater bit rate generally has a larger transmission error rate than data at a smaller bit rate. Thus, the present variant is characterized in that an optical amplifier is used for amplification when transmitting and receiving a high-speed (bit-rate-B) data signal.

Figure 13:
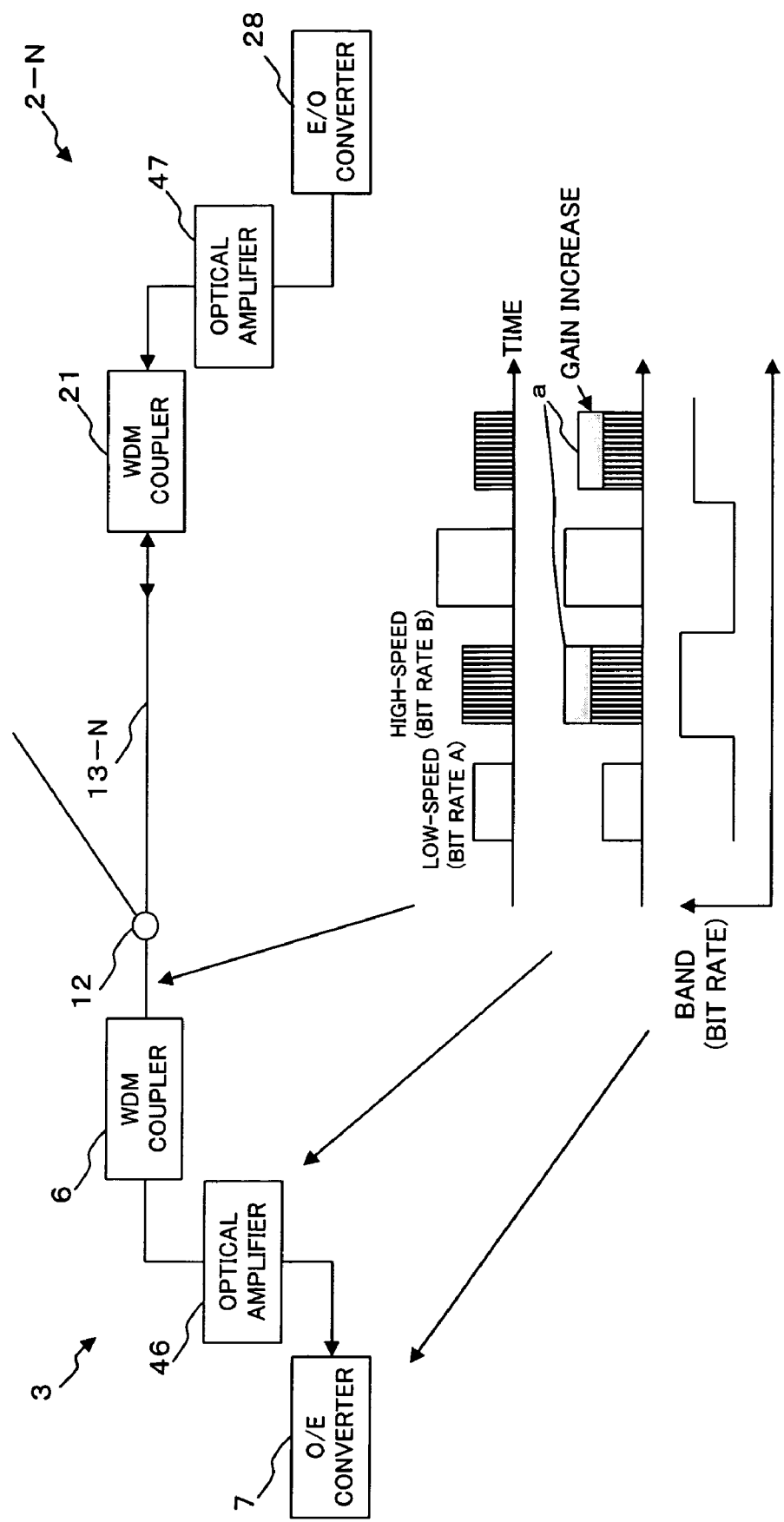
FIG. 13 is a block diagram showing the configuration of principal parts of a PON system (multi-bit-rate optical communication system) according to a fourth variant of the present invention.

FIG. 13 is a block diagram of the configuration of principal parts of a PON system (multi-bit-rate optical communication system) according to the present variant.

As shown in FIG. 13, the OLT 3 in the present variant is comprised of an optical amplifier (first optical amplifier) 46 between the WDM coupler 6 and the O/E converter 7 described above with reference to FIG. 1, and the ONU 2-N is comprised of an optical amplifier (second optical amplifier) 47 between the WDM coupler 21 and the E/O converter 28 described above. Here, the optical amplifiers 46 and 47 may be provided only in one of the OLT 3 and the ONU 2-N.

Here, the optical amplifier 46 on the OLT 3 side is used to amplify a data signal at the bit rate B through ON control at a time when the OLT 3 performs reception processing of the data signal at the bit rate B. A semiconductor optical amplifier, for example, is used for the optical amplifier 46 and this enables quick operation switching by ON/OFF control. The ON/OFF control of the optical amplifier 46 is performed, for example, by the framing processing unit 4 that knows transmission/reception timing of data.

The optical amplifier 47 on the ONU 2-N side is used to amplify a transmission data signal at the bit rate B through ON control at a time when upstream data is transmitted. Like the above optical amplifier 46, a semiconductor optical amplifier, for example, is used for the optical amplifier 47 and this enables quick operation switching by ON/OFF control. Here, the ON/OFF control of the optical amplifier 47 is performed, for example, by the frame synchronization/management information processing unit 24 that knows transmission timing of data.

Then, as indicated by a symbol a in FIG. 13, a transmission error rate can be reduced by amplifying only high-speed data signals by turning on at least one of the optical amplifiers 46 and 47 at a time when performing transmission/reception processing of a data signal at the bit rate B.

Also, by designing (setting) transmission power of the ONU 2-N larger than that of any of other ONUs 2-1 to 2-(N−1) in advance, an effect equivalent to that of the present variant can be obtained without amplifying upstream data signal on the ONU 2-N side by the optical amplifier 47.

Moreover, the optical amplifier 46 may be configured to provide a variable bandwidth therein so that an amplification gain and a reception bandwidth are changed in accordance with the bit rate of a received data signal. For example, the amplification gain and the reception bandwidth of the optical amplifier 46 may be changed so that only data at the bit rate B is amplified. This makes it possible to amplify data signals at high bit rates selectively that cause greater transmission error rates so that a transmission/reception power level suitable for data communication can be set.

Incidentally, each of the OLT 3 and the high-speed ONU 2-N is comprised of a receiver for the bit rate B with components of the above-described O/E converters 7 and 22 so that reception processing of data at the bit rate B can be performed, and each of the existing ONUs 2-1 to 2-(N−1) is comprised of a receiver for the bit rate A with a component of the above-described O/E converter 15. Then, each of these receivers has a reception preamplifier internally, and in addition to signal amplification by the above-described optical amplifiers 46 and 47, amplification by the reception preamplifier can also be considered.

Figure 14:
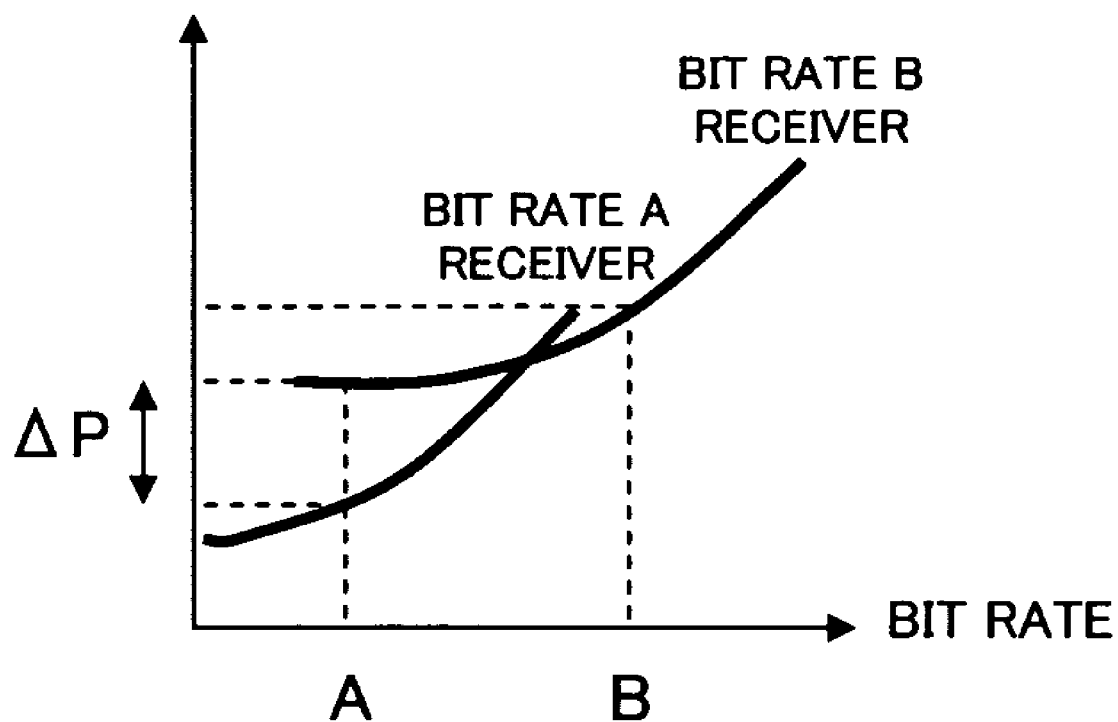
FIG. 14 is a diagram showing reception characteristics of a receiver (O/E converter) according to the fourth variant.

As is evident from FIG. 14 showing reception characteristics of each receiver, when receiving data at the same bit rate A, a difference in minimum reception sensitivity ΔP resulting from reception characteristics regarding reception sensitivity generally exists between a receiver for the bit rate B and a receiver for the bit rate A. The ΔP is determined by noise characteristics of reception preamplifiers provided inside the O/E converters 7, 22, and 15, and the noise characteristics are further determined by feedback resistor of the reception preamplifier.

Here, an operation of the preamplifier will be described by showing an internal configuration of the O/E converters 7, 22, and 15 in FIG. 15.

Each of the O/E converters 7, 22, and 15 is comprised of a photo diode (PD), a reception preamplifier 48, and a variable feedback resistor 49. Here, a capacitor Cin equivalently represents a stray capacitance held by the circuit.

The reception preamplifier 48 is used to amplify an electrical signal (data signal) obtained in accordance with an amount of light received by the PD and the amplification gain thereof is P.

The feedback resistor 49 is used to control an input impedance Rin (See a formula (1) below) of the reception preamplifier 48 and has a variable resistance Rf.

Figure 15:
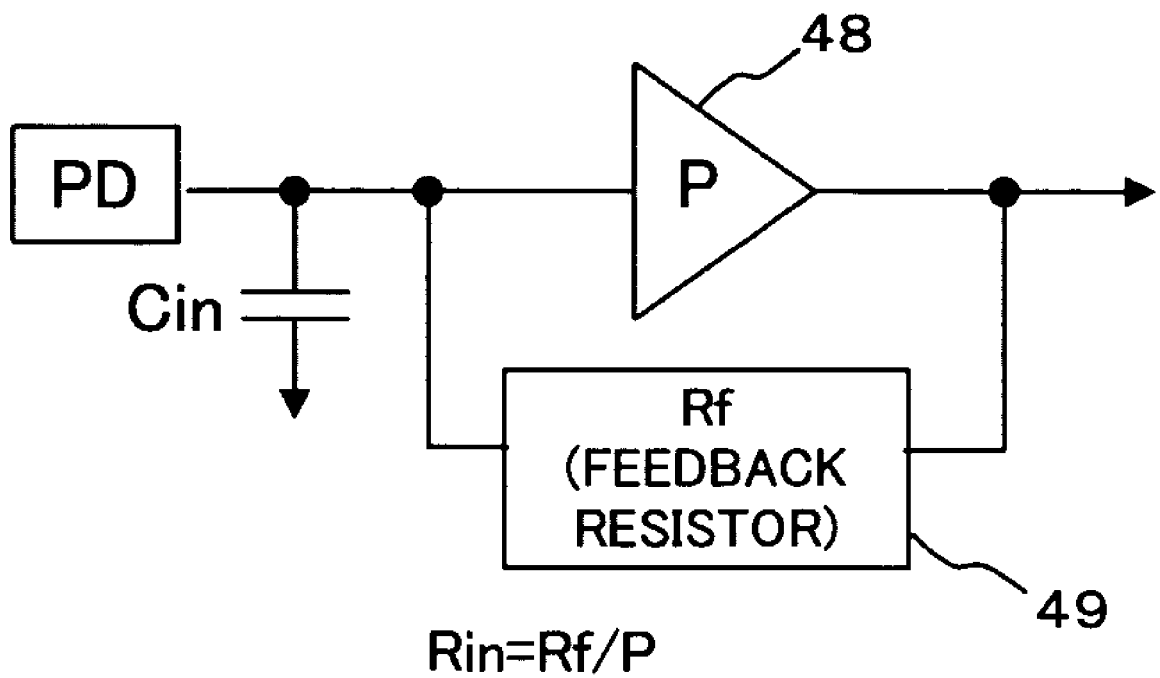
FIG. 15 is a diagram showing an internal configuration of the O/E converter shown in FIG. 13.

Here, an optimal preamplifier band for a bit rate is generally represented by fc=0.7×bit rate, and in addition, each variable and constant related to the O/E converters 7, 22, and 15 shown in FIG. 15 is known to satisfy formulas (1) to (4) shown below:

$$Rin = Rf/P \tag{1}$$

$$fc = 1/(\sqrt{2\pi} Cin \times Rin) \tag{2}$$

$$Noise \propto 1/Rf \tag{3}$$

$$Gain \propto Rf \tag{4}$$

If, at this point, Cin (stray capacitance) is constant, from the above formulas (1) and (2), the variable resistance Rf must be made smaller to increase a bandwidth of the reception preamplifier 48, but it is evident from the formula (4) that making the variable resistance Rf smaller increases noise, thereby decreasing reception sensitivity of the PD. It is also evident from the formula (4) that making the variable resistance Rf smaller reduces the amplification gain P of the reception preamplifier 48.

That is, through variable control of the variable resistance Rf, the amplification gain P in accordance with the bit rate (band) can be obtained.

Figure 16:
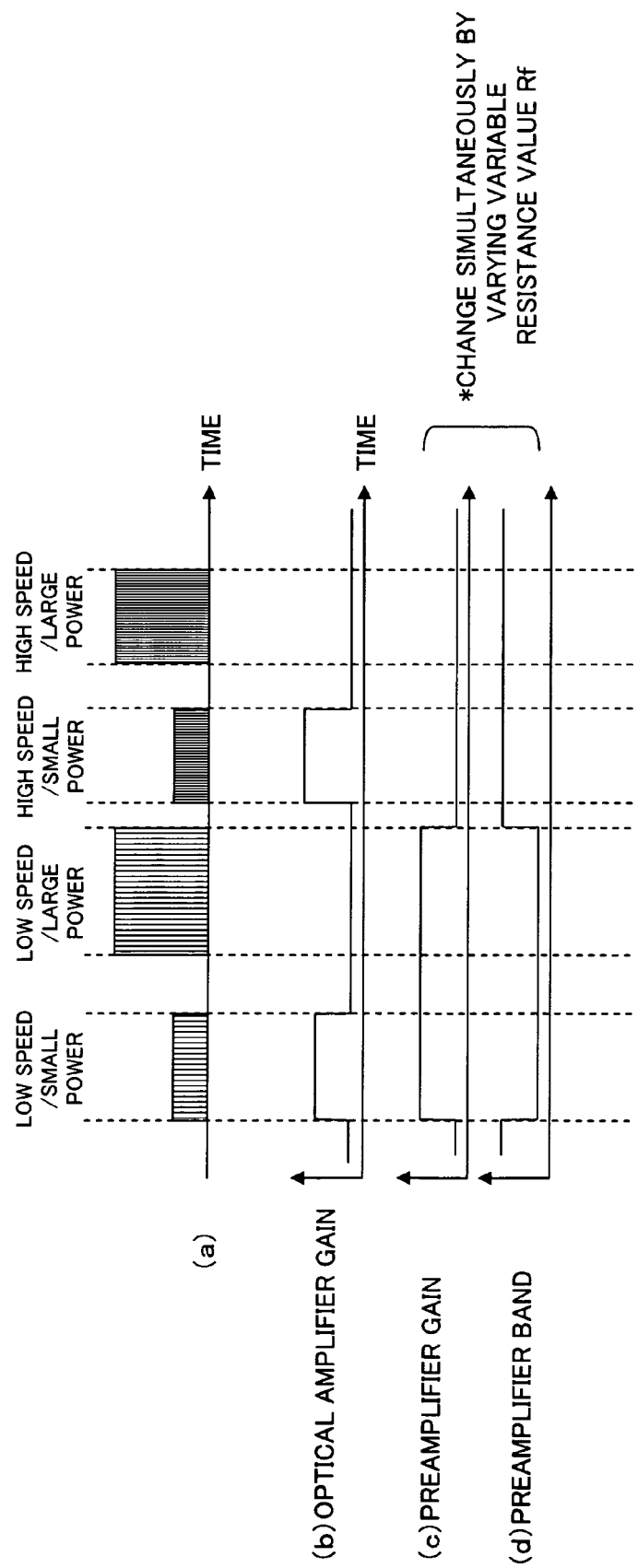
FIG. 16 is a diagram illustrating an example of received data signals according to the fourth variant and amplification results thereof.

FIG. 16 shows an example of received data signals and amplification results thereof.

If, for example, as shown in (a) of FIG. 16, a low-power low-speed signal, a high-power low-speed signal, a low-power high-speed signal, and a high-power high-speed signal are received one after another by the OLT 3, first, as shown in (b), the low-power low-speed signal and the low-power high-speed signal are amplified by controlling the amplification gain of the optical amplifier 46. For example, a semiconductor optical amplifier (SOA) can be used as the optical amplifier 46. Moreover, the low-power low-speed signal and the low-power high-speed signal can also be amplified by the optical amplifier 46, which is obtained by combining an optical amplifier such as an erbium doped fiber amplifier (EDFA)

and an optical modulator (for example, a lithium niobate (LN) modulator or an electro-absorption (EA) modulator).

Then, in the reception preamplifier 48 in the succeeding stage of the optical amplifier 46, through gain and band control shown in (c) and (d) by controlling the variable resistance Rf, a low-speed data signal is amplified by increasing the variable resistance Rf at a time when the low-speed data signal is received and a high-speed data signal is amplified by decreasing the variable resistance Rf at a time when the high-speed data signal is received. Here, as is evident from the above formulas (1) to (4), by making the variable resistance Rf variable, the amplification gain and amplification band of the reception preamplifier 48 change simultaneously.

Since, as described above, high-speed data signals can also be amplified by the O/E converter 7 in the succeeding stage of the optical amplifier 46 by the reception preamplifier 48, only the high-speed data signals can be amplified to reduce the transmission error rate.

In addition, in the example shown in FIG. 16, it is also possible to cause the optical amplifier 46 not to operate at a time when a low-power low-speed signal is received and to amplify the low-power low-speed signal only by the reception preamplifier 48 in the succeeding stage, which can reduce power consumption of the optical amplifier 46.

[F] Description of the Fifth Variant

Figure 17:
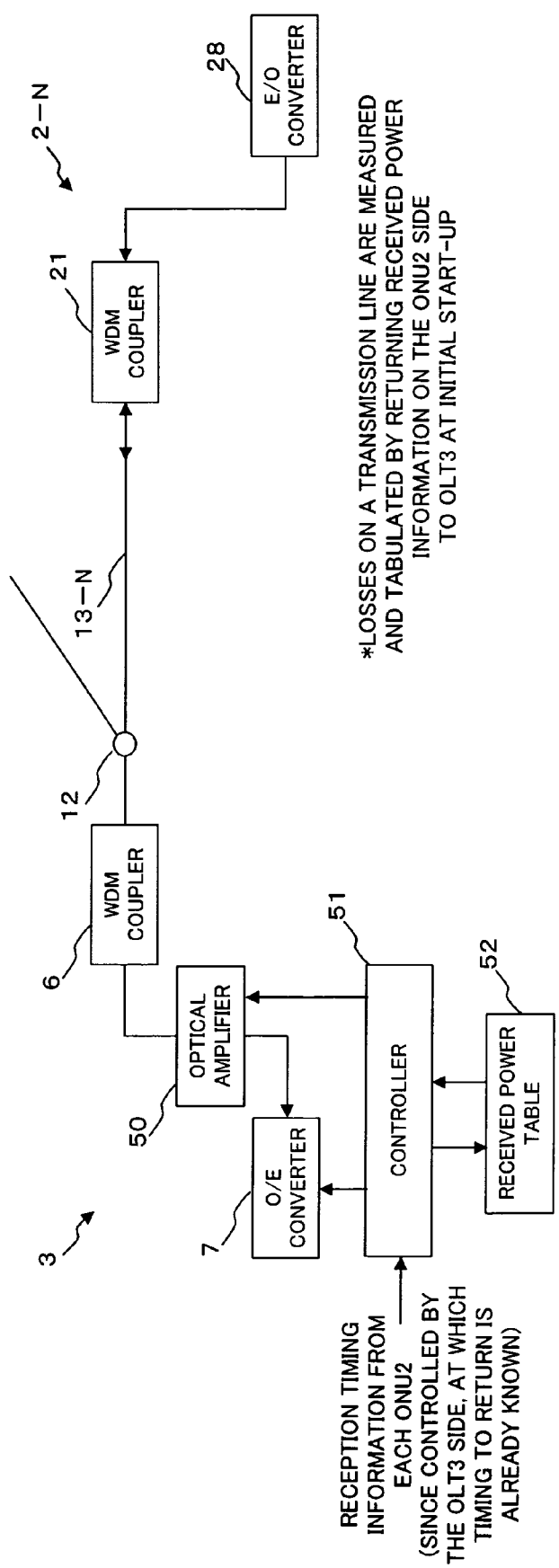
FIG. 17 is a block diagram showing the configuration of principal parts of a PON system (multi-bit-rate optical communication system) according to a fifth variant of the present invention.

FIG. 17 is a block diagram showing the configuration of principal parts of a PON system according to the fifth variant.

As shown in FIG. 17, the OLT 3 in the present variant is comprised of the above-described framing processing unit 4, the E/O converter 5, the bit synchronization processing unit 8, the $M_{up}$ frequency demultiplier circuit 9, and the data processing unit 10, as well as the WDM coupler 6, an optical amplifier 50, the O/E converter 7, a controller 51, and a received power table 52.

Here, the controller 51 is used to control the amplification gain and reception bandwidth (bit rate intended for amplification) of the optical amplifier 50 and the reception preamplifier 48 in the O/E converter 7 based on reception timing information from each ONU 2 and various kinds of information obtained from the received power table 52.

The received power table 52 is a table holding received power of data signals (light) received by each ONU 2 and holds, for example, an address to identify each ONU 2 and a received power value of a data signal received via a transmission line (optical fiber) 13 by each ONU 2 by associating them.

That is, in the present variant, for example, at initial startup of the system, the OLT 3 is notified of received power measured at the ONU 2, and further, the notified received power is held in the received power table 52 on the OLT 3 side. Then, the controller 51 adjusts the amplification gain and reception bandwidth of the optical amplifier 50 and the reception preamplifier 48 based on the received power table 52.

This makes it possible to control the amplification gain of the optical amplifier 50 and the reception preamplifier 48 also in the above-described PON system in which multiple bit rates are used so that each data signal satisfies a required code error rate (for example, 10-12).

So far, one embodiment of the present invention has been described, but the present invention is not limited to the above-described embodiment and can be embodied in any form without departing from the spirit of the present invention.

For example, in the above embodiment and each variant, operations were described under the assumption of $M_{up}=M_{down}$ (=M), but $M_{up}$ and $M_{down}$ may naturally take different values.

Moreover, a plurality of ONUs 2 to perform reception processing of a high-speed (bit-rate-B) data signal may exist.

Furthermore, the number of multiple bit rates may be 3 or more, and in this case, for example, each of the ONUs 2 has a frequency demultiplier circuit for each bit rate to be received and the OLT 3 is configured to have a plurality of frequency demultiplier circuits so that reception processing of data signals of all bit rates can be performed.

What is claimed is:

1. A multi-bit-rate optical communication method in an optical communication system having an optical line terminal, a plurality of optical network units including a first optical network unit capable of receiving data at a first bit rate of once every $M_{down}$ bits and a second optical network unit capable of receiving data at a second bit rate which is said first bit rate x a first constant $M_{down}$ where $M_{down}$ is greater than 1 so that the second bit rate is thereby higher than the first bit rate, and a branching unit to branch an optical signal transmitted from the optical line terminal in a predetermined frame format to said plurality of optical network units, the method comprising:

transmitting, by the optical line terminal, a first data area including frame synchronization information in said frame format at the first bit rate, and transmitting a second data area at the second bit rate;

performing, by the second optical network unit, reception processing of the optical signal from the branching unit at the first bit rate to detect said frame synchronization information in the first data area in said frame format; and performing, by the second optical network unit, based on the detected frame synchronization information, reception processing of the second data area at the second bit rate in said frame format.

2. The multi-bit-rate optical communication method according to claim 1, wherein said $M_{down}$ is an integer.

3. The multi-bit-rate optical communication method according to claim 2, further comprising:

detecting, by the second optical network unit, an edge of a received optical signal, and controlling, by the second optical network unit, start timing of the reception processing at the rate once every $(M_{down})$ bits based on the detection of the edge.

4. The multi-bit-rate optical communication method according to claim 2, further comprising:

performing, by the second optical network unit, reception processing of said optical signal at a clock frequency corresponding to said second bit rate to detect an $(M_{down})$ bits same code continuing portion, and performing, by the second optical network unit, reception processing of the same code continuing portion at the rate once every $(M_{down})$ bits to detect said frame synchronization information.

5. The multi-bit-rate optical communication method according to claim 1, further comprising:

detecting, by the second optical network unit, an edge of a received optical signal and controlling, by the second optical network unit, start timing of the reception processing at the rate once every $(M_{down})$ bits based on the detection of the edge.

6. The multi-bit-rate optical communication method according to claim 1, further comprising:

performing, by the second optical network unit, reception processing of said optical signal at a clock frequency corresponding to said second bit rate to detect an $(M_{down})$ bits same code continuing portion and performing, by the second optical network unit, reception processing of the same code continuing portion at the rate once every ($M_{down}$) bits to detect said frame synchronization information.

7. The multi-bit-rate optical communication method according to claim 1, wherein an optical signal at said second bit rate includes an error correction code.

8. A multi-bit-rate optical communication method in an optical communication system having a first optical network unit that transmits an optical signal at a first bit rate, a second optical network unit that transmits an optical signal at a second bit rate which is said first bit rate x a second constant ($M_{up}$) greater than 1, a multiplexing unit to multiplex an optical signal from each of said first and second optical network units, and an optical line terminal for receiving an optical signal multiplexed by the multiplexing unit, the method comprising:
performing, by the optical line terminal,
reception processing of an optical signal from the multiplexing unit at a clock frequency corresponding to said second bit rate to establish bit synchronization, and
reception processing of an optical signal of said first bit rate at a rate once every $M_{up}$ bits and reception processing of an optical signal of said second bit rate by each bit, based on predetermined transmission timing for each of said first and second optical network units.

9. The multi-bit-rate optical communication method according to claim 8, wherein said $M_{up}$ is an integer.

10. The multi-bit-rate optical communication method according to claim 8, further comprising:
amplifying, by the optical line terminal, an optical signal by a first optical amplifier when performing reception processing of the optical signal at said second bit rate.

11. The multi-bit-rate optical communication method according to claim 10, wherein the first optical amplifier has a variable bandwidth, and a gain and a reception bandwidth of the first optical amplifier are changed depending on whether a bit rate of the received optical signal is said first bit rate or second bit rate.

12. The multi-bit-rate optical communication method according to claim 11, further comprising:
measuring received power by each of the first optical network unit and the second optical network unit at system initial start-up,
notifying a measurement result of said measuring to the optical line terminal, and
adjusting, by the optical line terminal, based on said notified measurement result, the gain and the reception bandwidth of the first optical amplifier.

13. The multi-bit-rate optical communication method according to claim 10, wherein the first optical amplifier is a semiconductor optical amplifier.

14. The multi-bit-rate optical communication method according to claim 8, further comprising:
transmitting, by the second optical network unit, an optical signal at said second bit rate; and
amplifying the optical signal by a second optical amplifier when transmitting it.

15. The multi-bit-rate optical communication method according to claim 8, wherein optical transmission power of the second optical network unit that transmits an optical signal at said second bit rate is set larger than that of the first optical network unit that transmits an optical signal at said first bit rate.

16. An optical network unit used in an optical communication system having an optical line terminal that transmits a first data area including frame synchronization information in a predetermined frame format at a first bit rate of once every ($M_{down}$) bits, and transmits a second data area at a second bit rate which is said first bit rate x a first constant ($M_{down}$) greater than 1, a plurality of optical network units including a first optical network unit capable of receiving data at said first bit rate and a second optical network unit capable of receiving data at said second bit rate, and a branching unit to branch an optical signal transmitted from the optical line terminal in said frame format to said plurality of optical network units, said optical network unit used in an optical communication system being said second optical network unit and comprising:
a frame synchronization processing unit that performs reception processing of an optical signal from the branching unit at the first bit rate to detect said frame synchronization information in the first data area in said frame format; and
a data processing unit that performs reception processing of the second data area in said frame format at said second bit rate based on the frame synchronization information detected by the frame synchronization processing unit.

17. The optical network unit used in an optical communication system according to claim 16, wherein said $M_{down}$ is an integer.

18. The optical network unit used in an optical communication system according to claim 16, wherein the frame synchronization processing unit comprises:
an edge detector for detecting an edge of the received optical signal; and
a controller for controlling start timing of the reception processing at the rate once every $M_{down}$ bits based on the detection timing by the edge detector.

19. The optical network unit used in an optical communication system according to claim 16, wherein the frame synchronization processing unit comprises:
a same code continuing detector for detecting an $M_{down}$ bits same code continuing portion by performing reception processing of said optical signal at a clock frequency corresponding to said second bit rate; and
a frame synchronization detector for detecting said frame synchronization information by performing reception processing of the same code continuing portion detected by the same code continuing detector at the rate once every $M_{down}$ bits.

20. An optical line terminal used in an optical communication system having a first optical network unit that transmits an optical signal at a first bit rate, a second optical network unit that transmits an optical signal at a second bit rate which is said first bit rate x a second constant $M_{up}$ greater than 1, a multiplexing unit to multiplex an optical signal from said each of optical network units, and an optical line terminal that receives an optical signal multiplexed by the multiplexing unit, said optical line terminal comprising:
a bit synchronization processing unit for establishing bit synchronization by performing reception processing of an optical signal from the multiplexing unit at a clock frequency corresponding to said second bit rate; and
a data processing unit for performing reception processing of an optical signal of said first bit rate at a rate once every $M_{up}$ bits and an optical signal of said second bit rate by each bit, based on predetermined transmission timing for each of said first and second optical network units.

* * * * *